US012640514B2

(12) United States Patent
Wankoff et al.

(10) Patent No.: US 12,640,514 B2
(45) Date of Patent: May 26, 2026

(54) LIQUID AND CONNECTION DETECTION

(71) Applicant: Apple Inc., Cupertino, CA (US)

(72) Inventors: Eric B. Wankoff, San Francisco, CA (US); Peter J. Cameron, Scotts Valley, CA (US); Mahmoud R. Amini, Sunnyvale, CA (US); Daren L. Rimando, Milpitas, CA (US); Sotirios Lyrintzis, Fishers, IN (US); Makiko K. Brzezinski, Santa Clara, CA (US); Adam H. Herzog, Los Altos, CA (US); Mohammed Nasser Khamis Al Jashmi, San Jose, CA (US); George Tziviskos, San Jose, CA (US); Aaron N. Miletich, Lodi, CA (US); Collin Greene, San Francisco, CA (US); Jason S. Sloey, Cedar Park, TX (US); Sydney Puckett, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 18/244,836

(22) Filed: Sep. 11, 2023

(65) Prior Publication Data

US 2024/0106158 A1 Mar. 28, 2024

Related U.S. Application Data

(60) Provisional application No. 63/409,633, filed on Sep. 23, 2022.

(51) Int. Cl.
*H01R 13/52* (2006.01)
*H01R 13/641* (2006.01)

(52) U.S. Cl.
CPC .......... *H01R 13/52* (2013.01); *H01R 13/641* (2013.01)

(58) Field of Classification Search
None
See application file for complete search history.

(56) References Cited

U.S. PATENT DOCUMENTS 9,335,355 B2 * 5/2016 Menzel ................ G06F 1/1613
9,825,410 B2 * 11/2017 Scritzky ............ H01R 13/6582
9,991,640 B2 * 6/2018 Tziviskos ............ H01R 24/64
10,658,797 B2 5/2020 Andre et al.
11,658,443 B2 5/2023 Ashcroft et al.
2013/0288520 A1 * 10/2013 Simmel ............ H01R 13/6583 439/660
2014/0120778 A1 5/2014 Yu et al.
(Continued)

FOREIGN PATENT DOCUMENTS

CN 203983639 U 12/2014
JP 2008146865 A 6/2008

OTHER PUBLICATIONS

United Kingdom Patent Application No. GB2314145.0 , "Combined Search and Examination Report", Mar. 8, 2024, 4 pages.
(Continued)

*Primary Examiner* — Tho D Ta
(74) *Attorney, Agent, or Firm* — Kilpatrick Townsend & Stockton LLP

(57) ABSTRACT

Connector receptacles and connector receptacle interfaces that can detect a connection to a corresponding connector insert, can detect liquid in the connector receptacle, and can limit damage to the connector receptacle caused by the liquid.

19 Claims, 25 Drawing Sheets

(56) References Cited

U.S. PATENT DOCUMENTS

| | | | | |
|---|---|---|---|---|
| 2017/0358895 | A1 | 12/2017 | Chung | |
| 2018/0090884 | A1 | 3/2018 | Jeon et al. | |
| 2020/0259298 | A1* | 8/2020 | Tyrrell | H01R 13/70 |
| 2020/0319675 | A1* | 10/2020 | Beckham | G06F 1/182 |

OTHER PUBLICATIONS

Korean Patent Application No. 10-2023-0123085, “Office Action”, Feb. 28, 2025, 8 pages.

* cited by examiner

LIQUID AND CONNECTION DETECTION

CROSS-REFERENCES TO RELATED APPLICATIONS

The present application claims the benefit of and priority to United States provisional application 63/409,633, filed Sep. 23, 2022, which is incorporated by reference.

BACKGROUND

The number of types of electronic devices that are commercially available has increased tremendously the past few years and the rate of introduction of new devices shows no signs of abating. Devices such as tablet computers, laptop computers, all-in-one computers, desktop computers, smart phones, storage devices, wearable-computing devices, portable media players, portable computing devices, navigation systems, monitors, audio devices, remotes, adapters, and others have become ubiquitous.

These electronic devices can share data and power through cables that can have connector inserts on each end that can be inserted into connector receptacles in the electronic devices. A connector receptacle can include contacts that can form electrical connections with corresponding contacts in a connector insert.

Liquid can occasionally enter a connector receptacle. This liquid can be sweat from a user working out. The liquid can be spilled on or near the electronic device housing the connector receptacle. The liquid can come from the electronic device being submerged. Whatever the source, this liquid can corrode the contacts in the connector receptacle.

Accordingly, it can be desirable to be able to detect liquid in a connector receptacle such that mitigating steps can be taken to avoid contact corrosion. But these mitigating steps might depend on whether a connector insert has been inserted into the connector receptacle. Accordingly, it can also be desirable to be able to detect whether a connection has been made between the connector receptacle and a corresponding connector receptacle.

Thus, what is needed are connector receptacles and connector receptacle interfaces that can detect a connection to a corresponding connector insert, can detect liquid in the connector receptacle, and can limit damage to the connector receptacle caused by the liquid.

SUMMARY

Accordingly, embodiments of the present invention can provide connector receptacles and connector receptacle interfaces that can detect a connection to a corresponding connector insert, can detect liquid in the connector receptacle, and can limit damage to the connector receptacle caused by the liquid.

An illustrative embodiment of the present invention can provide a connector receptacle that can detect a connection to a corresponding connector insert. The connector receptacle can include one or more connection-detect contacts at openings in a passage that allows access to a tongue. Side ground contacts can also be placed at one or more openings in the passage. In one example, connection-detect contacts can be above or below the tongue and the side ground contacts can be aligned with ends of the tongue. In another example, both connection-detect contacts and the side ground contacts can be aligned with ends of the tongue, such that one connection-detect contact and one side ground contact is at each end of the tongue. In this example, the connection-detect contact and side ground contact on each end of the tongue can share an opening, or they can have different openings. In another example, one connection-detect contact can be at a first end of the tongue and one side ground contact can be at a second end of the tongue. The side ground contact can have a contacting portion nearer to a front of the connector receptacle as compared to the connection-detect contact. This can ensure that ground is the first connection made during an insertion of the corresponding connector insert and the last connection that is broken during an extraction of the corresponding connector insert. That is, as a corresponding connector insert is inserted, the shield of the connector insert can engage the side ground contact, forming a ground path through the connector insert and connector receptacle before the connection-detection or other contacts are reached. During extraction, the shield and side ground contact can remain engaged until after the connection-detection and other contacts are disconnected. This can help to prevent damage that can otherwise occur due to stray voltages at the connectors.

These and other embodiments of the present invention can employ reinforced space-saving side ground contacts to help increase a retention force of the side ground contacts and to reduce a width of a connector receptacle. These side ground contacts can be reinforced with tabs that extend along an outward facing side of the side ground contacts. These tabs can be a portion of a housing for a connector receptacle. The tabs can provide reinforcement that can increase a retention force of the side ground contacts. The tabs can limit a possible deflection of the side ground contacts, thereby allowing the connector receptacle to have a reduced width.

The connector receptacles can be connected to connector receptacle interface circuits that can determine that a connection-detect contact is grounded when it forms an electrical connection with a ground on a shield of the corresponding connector insert. Once the connector receptacle interface circuits determine that a connection-detect contact is grounded, it can be determined that a corresponding connector insert has been inserted into the connector receptacle.

These and other embodiments of the present invention can detect liquid in a connector receptacle. In an example, liquid-detect contacts can be placed on top and bottom sides of a tongue. The liquid-detect contacts can be intermixed with, or placed between, signal and power contacts on the tongue. Signal and power contacts can be routed to provide sufficient space for the liquid-detect contacts. In one example, a signal contact can be routed around a liquid-detect contact while a power contact can be routed straight such that resistance of the power contact is maintained and not increased. The liquid-detect contacts can be short in length, extending only a short distance beyond an EMI or ground pad on a top of the tongue and an EMI or ground pad on a bottom of the tongue. In this way, the liquid-detect contacts do not connect to any of the contacts of the connector insert when the connector insert is inserted into the connector receptacle. Also, the liquid-detect contacts can be strategically placed between contacts most likely to corrode, for example between a VBUS contact and a CC contact in a USB Type-C connector receptacle. In another example, both signal and power contacts can be routed around liquid-detect contacts. In one example, a signal contact and a power contact can both be routed around a liquid-detect contact. This can allow the liquid-detect contact to have an increased size thereby improving sensitivity of the liquid-detect contact.

In another example, the high-speed transmit and receive contact pairs are not used by the connector receptacle. Accordingly, liquid-detect contacts can be placed in the spaces where the high-speed transmit and receive contact pairs would otherwise be located. In these and other embodiments of the present invention one, two, three, four, or more than four liquid-detect contacts can be included on a tongue or elsewhere in a connector receptacle. These liquid-detect contacts can connect to a single plane that can be positioned in a center of the tongue. This single plane can be connected to connector receptacle interface circuitry using a single contact, which can save space in the electronic device housing the connector receptacle and simplify assembly. In another example, a portion of an EMI or ground pad on a top of the tongue and a portion of an EMI or ground pad on a bottom of the tongue can be removed and replaced by liquid-detect contacts.

The connector receptacle interface circuitry can provide a voltage waveform to the liquid-detect contacts to determine the presence of liquid using Electrochemical-Impedance Spectroscopy (EIS.) The voltage waveform can be a sinewave, square wave, or other voltage waveform. When liquid is present between a liquid-detect contact and a second contact, a current can result that can indicate a change in capacitance and resistance seen at the liquid-detect contact. That is, connector receptacle interface circuitry can detect the magnitude of this current and any phase shift as compared to the applied voltage, and from that determine a change in capacitance and resistance seen at the liquid-detect contact. From the changes in capacitance and resistance, the presence of liquid and information regarding the type of liquid that is present can be determined.

These and other embodiments of the present invention can employ various techniques and features to improve the sensitivity of this liquid detection. For example, features to help to guide liquid to one or more liquid-detect contacts can be included on a connector tongue or elsewhere in a connector receptacle or connector insert. Various hydrophobic and hydrophilic coatings can be deposited or otherwise placed on the tongue or associated structures to direct liquid to the liquid-detect contacts. Hydrophobic coatings or materials can be used to move liquid on a tongue away from a first location. Hydrophilic coatings or materials can be used to attract liquid to a second location on the tongue. For example, hydrophobic coatings or materials can be used to move liquid away from a front edge of a tongue, and hydrophilic coatings or materials can be used to move liquid towards a liquid-detect contact that is between contacts and near a ground pad, between a number of contacts and the ground pad, or at other locations on the tongue. In these and other examples, trenches, channels, or grooves can be formed in top and bottom sides of the tongue between contacts to direct liquid to the liquid-detect contacts. These trenches, channels, or grooves can provide a capillary effect to move liquid between locations on the tongue. In these and other embodiments of the present invention, liquid can be guided by the coatings, materials, or trenches to one or more liquid-detect contacts on a surface on or near the tongue.

Embodiments of the present invention can provide power adapters having connector receptacles that can accept connector inserts that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Embodiments of the present invention are shown below as being embodied in or circuits associated with USB Type-C receptacles. These and other embodiments of the present invention can be incorporated in other types of connectors and associated circuits as well. Also, while embodiments of the present invention are well-suited to use in connector receptacles, these and other embodiments of the present invention can be utilized in connector inserts and other types of connectors as well.

In these and other embodiments of the present invention, contacts, shields, and other conductive portions of a connector receptacle can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with nickel, gold, or other material.

The nonconductive portions, such as housings, moldings, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide connector receptacles that can be located in various types of devices, such as tablet computers, laptop computers, desktop computers, all-in-one computers, smart phones, storage devices, wearable-computing devices, portable computing devices, portable media players, navigation systems, monitors, audio devices, remotes, adapters, and other devices.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
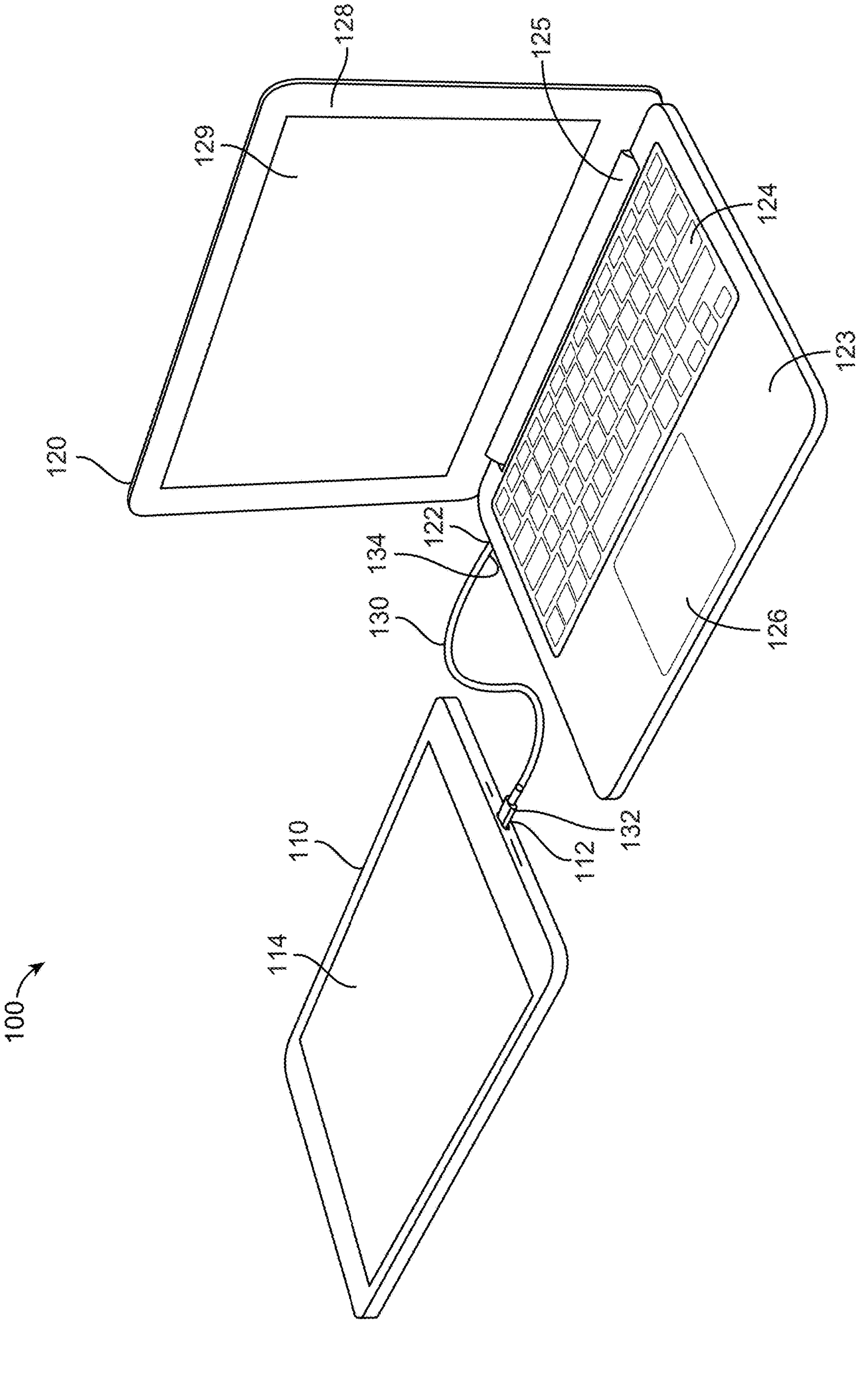
FIG. 1 illustrates an electronic system that can be improved by the incorporation of embodiments of the present invention.

FIG. 1 illustrates an electronic system that can be improved by the incorporation of embodiments of the present invention. This figure, as with the other included figures, is shown for illustrative purposes and does not limit either the possible embodiments of the present invention or the claims.

Electronic system 100 can include handheld computing device 110 and portable computing device 120. Handheld computing device 110 can include connector receptacle 112 and screen 114. Portable computing device 120 can include base 123 supporting keyboard 124 and touchpad 126. Portable computing device 120 can further include lid 128 supporting screen 129. Base 123 can be joined to lid 128 by hinge 125. Base 123 can include connector receptacle 122.

Cable 130 can convey power and data between handheld computing device 110 and portable computing device 120. Cable 130 can include a connector insert 132 at a first end that can be plugged into connector receptacle 112 of handheld computing device 110. Cable 130 can further include connector insert 134 at a second end that can be plugged into connector receptacle 122 of portable computing device 120.

In this example, electronic system 100 is shown as including handheld computing device 110 and portable computing device 120. In these and other embodiments of the present invention, electronic system 100 can include other types of devices. Also, while handheld computing device 110 is shown as a tablet computer and portable computing device 120 is shown as a laptop computer, either or both can be other types of devices, such as desktop computers, all-in-one computers, smart phones, storage devices, wearable-computing devices, portable computing devices, portable media players, navigation systems, audio devices, monitors, remotes, adapters, and other devices.

Embodiments of the present invention can provide connector receptacles, such as connector receptacle 112 and connector receptacle 122, and connector inserts, such as connector insert 132 and connector insert 134, that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

On occasion, liquid can enter a connector receptacle, such as connector receptacle 112, connector receptacle 122, or other connector receptacle. For example, handheld computer device 110 can be used during exercise and sweat can enter connector receptacle 112. A liquid can be spilled and can enter connector receptacle 112 on handheld computing device 110 or connector receptacle 122 on portable computing device 120. Handheld computing device 110 can be inadvertently submerged, or other events can happen to handheld computing device 110, portable computing device 120, or other electronic device. This liquid can cause corrosion of contacts in connector receptacle 112, connector receptacle 122, or other connector receptacle. Accordingly, it can be desirable to be able to detect this liquid such that mitigating steps can be taken. However, these mitigating steps can vary depending on whether a connector insert, such as connector insert 132, connector insert 134, or other connector insert has been inserted. Accordingly, embodiments of the present invention can provide systems, methods, and apparatus that can detect that a connector insert has been inserted into a connector receptacle, such as connector receptacle 112, connector receptacle 122 or other connector receptacle.

Various connectors, such as connector receptacles compliant with the Universal Serial Bus Type-C specifications, have a connection detection methodology using the "CC" contact. However, when liquid is detected, one mitigating step can be to turn off circuitry connected to contacts of the receptacle, including the CC contact. However, once the CC contact is disabled, the electronic device housing the connector can no longer determine when a corresponding connector insert has been inserted. Accordingly separate methods, circuits, and apparatus can be used to detect a connection to a corresponding connector. Examples are shown in the following figures.

Figure 2A:
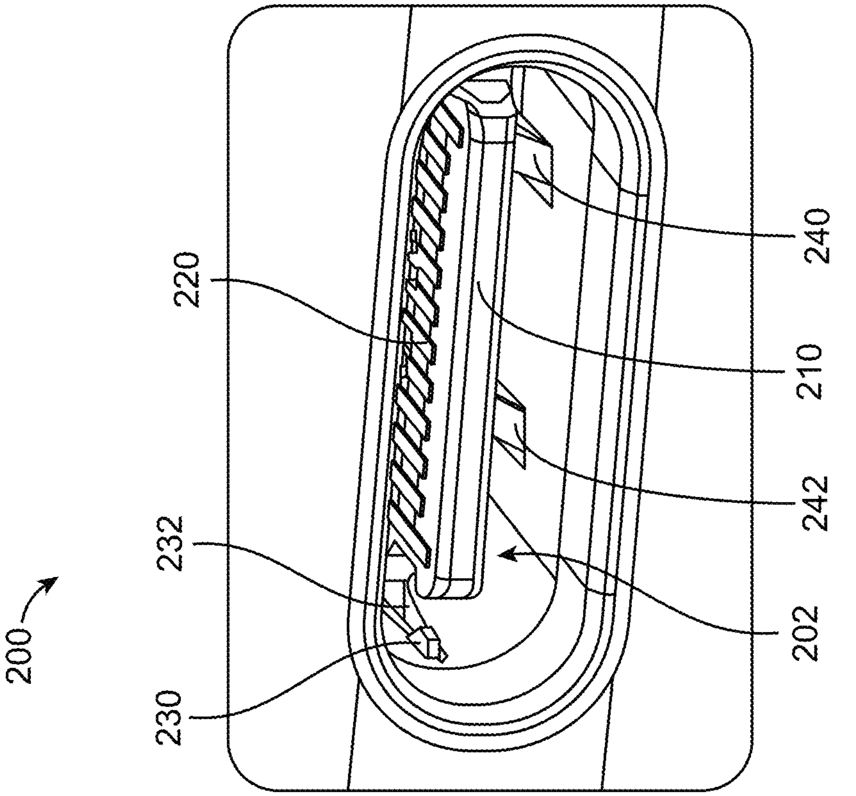
FIG. 2A and FIG. 2B illustrate a connector receptacle having connection-detect contacts according to an embodiment of the present invention.
Figure 2B:
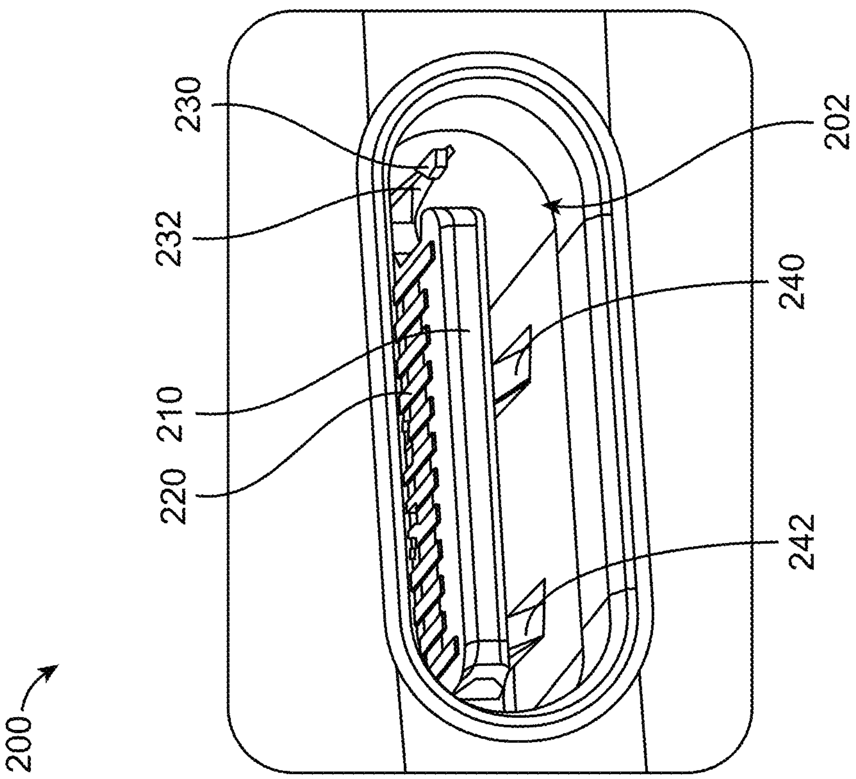

FIG. 2A and FIG. 2B illustrate a connector receptacle having connection-detect contacts according to an embodiment of the present invention. FIG. 2A illustrates connector receptacle 200. Connector receptacle 200 can be used as connector receptacle 112, connector receptacle 122 (both shown in FIG. 1), or as another connector receptacle consistent with an embodiment of the present invention. Connector receptacle 200 can include passage 202 providing access to contacts 220 on tongue 210. Side ground contact 230 can be approximately aligned with ends of tongue 210. Side ground contact 230 can be located in opening 232. One or more connection-detect contact 240 can be located in one or more openings 242, which can be positioned above or below tongue 210. Similarly, in FIG. 2B, connector receptacle 200 can include passage 202 providing access to contacts 220 on tongue 210. Side ground contact 230 can be approximately aligned with ends of tongue 210. One or more side ground contact 230 can be located in one or more openings 232. Connection-detect contacts 240 can be located openings 242, which can be positioned above or below tongue 210.

Figure 3B:
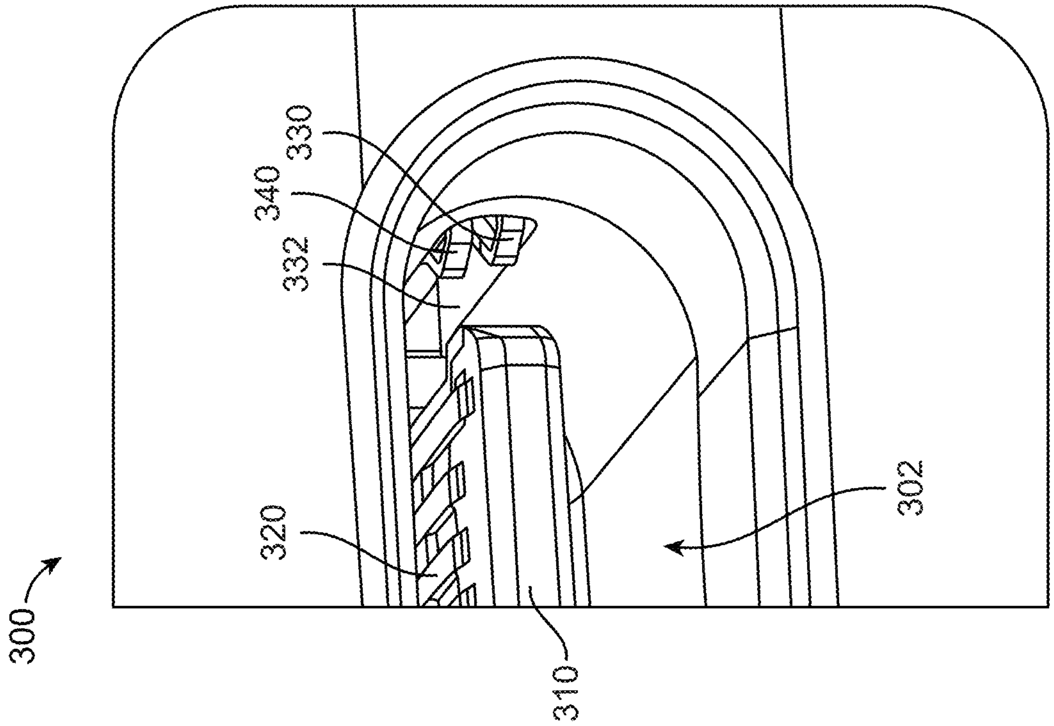
FIG. 3A and FIG. 3B illustrate another connector receptacle having connection-detect contacts according to an embodiment of the present invention.
Figure 3A:
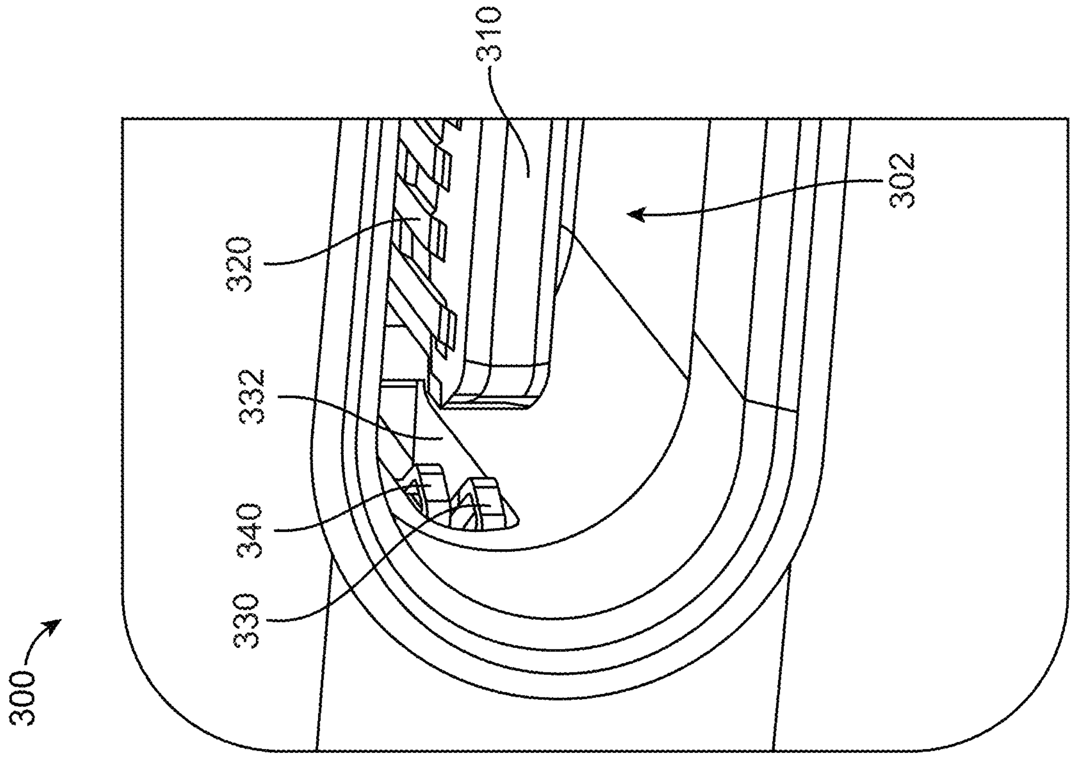

FIG. 3A and FIG. 3B illustrate another connector receptacle having connection-detect contacts according to an embodiment of the present invention. FIG. 3A illustrates connector receptacle 300. Connector receptacle 300 can be used as connector receptacle 112, connector receptacle 122 (both shown in FIG. 1), or as another connector receptacle consistent with an embodiment of the present invention. Connector receptacle 300 can include passage 302 providing access to contacts 320 on tongue 310. Side ground contact 330 can be approximately aligned with ends of tongue 310. Side ground contact 330 can be located in opening 332. Connection-detect contact 340 can also be located in opening 332. That is, side ground contact 330 and connection-detect contact 340 can share a single opening 332 near each end of tongue 310. Similarly, in FIG. 3B, connector receptacle 300 can include passage 302 providing access to contacts 320 on tongue 310. Side ground contact 330 can be approximately aligned with ends of tongue 310. Side ground contact 330 can be located in opening 332. Connection-detect contact 340 can also be located in opening 332. That is, side ground contact 330 and connection-detect contact 340 can share a single opening 332 near each end of tongue 310.

Figure 4A:
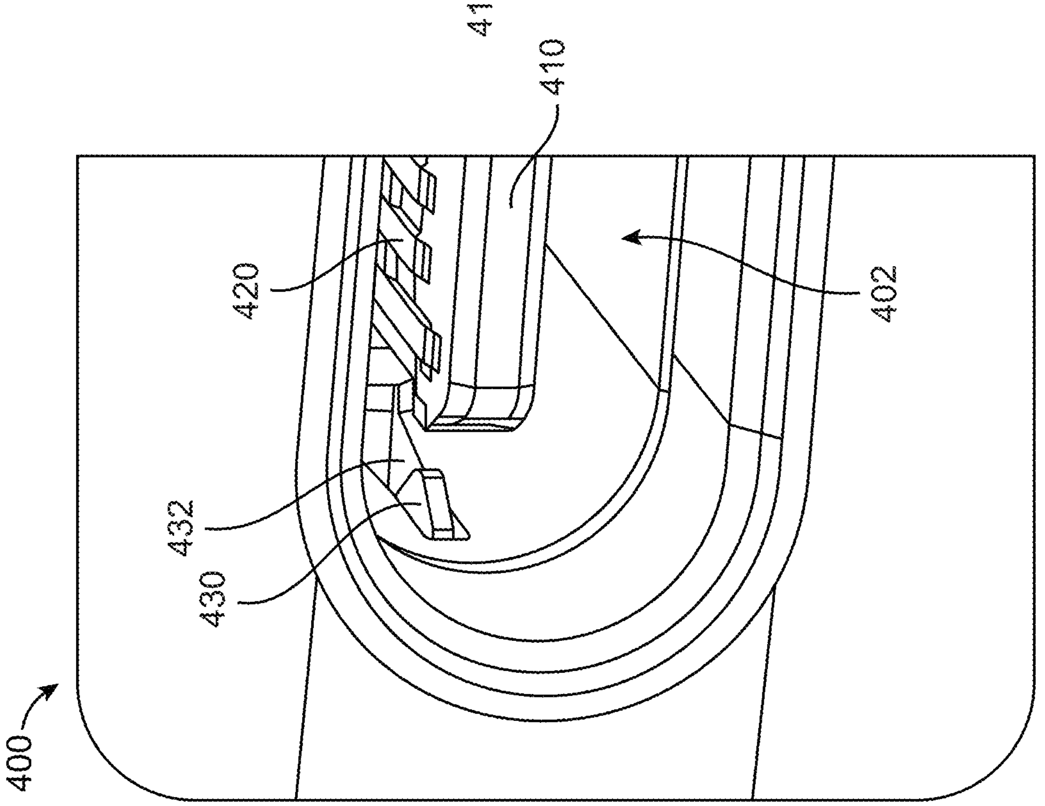
FIG. 4A and FIG. 4B illustrate another connector receptacle having connection-detect contacts according to an embodiment of the present invention.
Figure 4B:
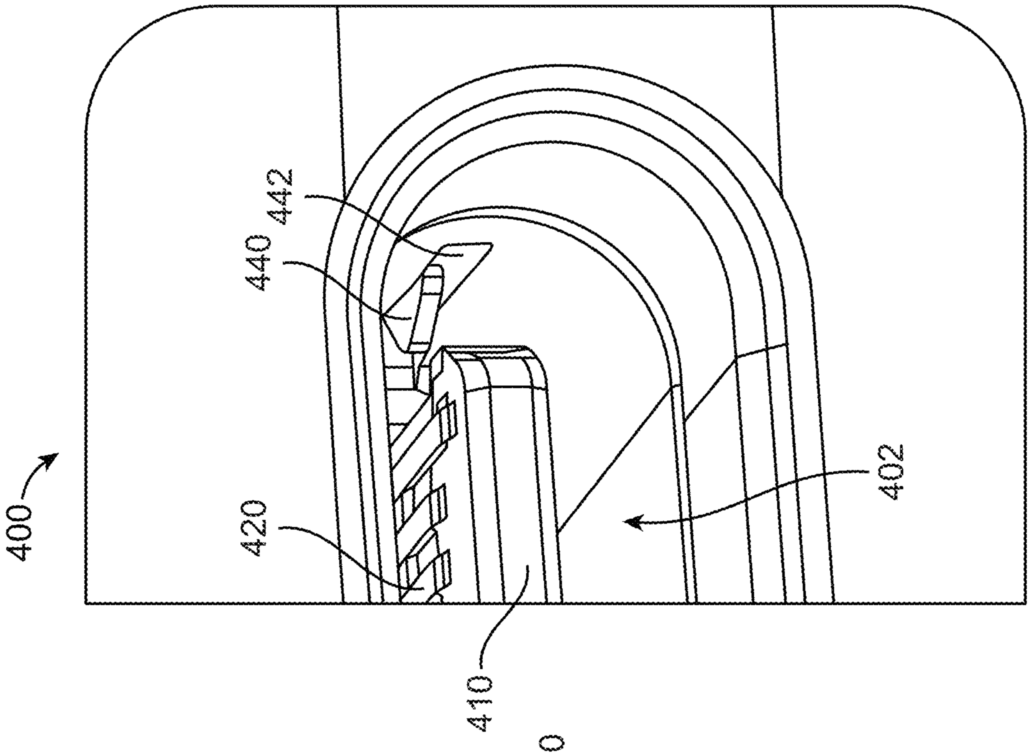

FIG. 4A and FIG. 4B illustrate another connector receptacle having connection-detect contacts according to an embodiment of the present invention. FIG. 4A illustrates connector receptacle 400. Connector receptacle 400 can be used as connector receptacle 112, connector receptacle 122 (both shown in FIG. 1), or as another connector receptacle consistent with an embodiment of the present invention. Connector receptacle 400 can include passage 402 providing access to contacts 420 on tongue 410. Side ground contact 430 can be approximately aligned with a first end of tongue 410. Side ground contact 430 can be located in opening 432. In FIG. 4B, connector receptacle 400 can include passage 402 providing access to contacts 420 on tongue 410. Connection-detect contact 440 can be located in opening 442, which can be approximately aligned with a second end of tongue 410.

In this way, side ground contact 430 can be in opening 432 at a first end of tongue 410 while connection-detect contact 440 can be in opening 442 at a second end of tongue 410. Side ground contact 430 can have a contacting portion nearer to a front of the connector receptacle as compared to connection-detect contact 440. This can ensure that ground is connected first during an insertion of the corresponding connector insert and broken last during an extraction of the corresponding connector insert. This can help to prevent damage that can otherwise occur due to stray voltages. This is shown further in the following figure.

Figure 5:
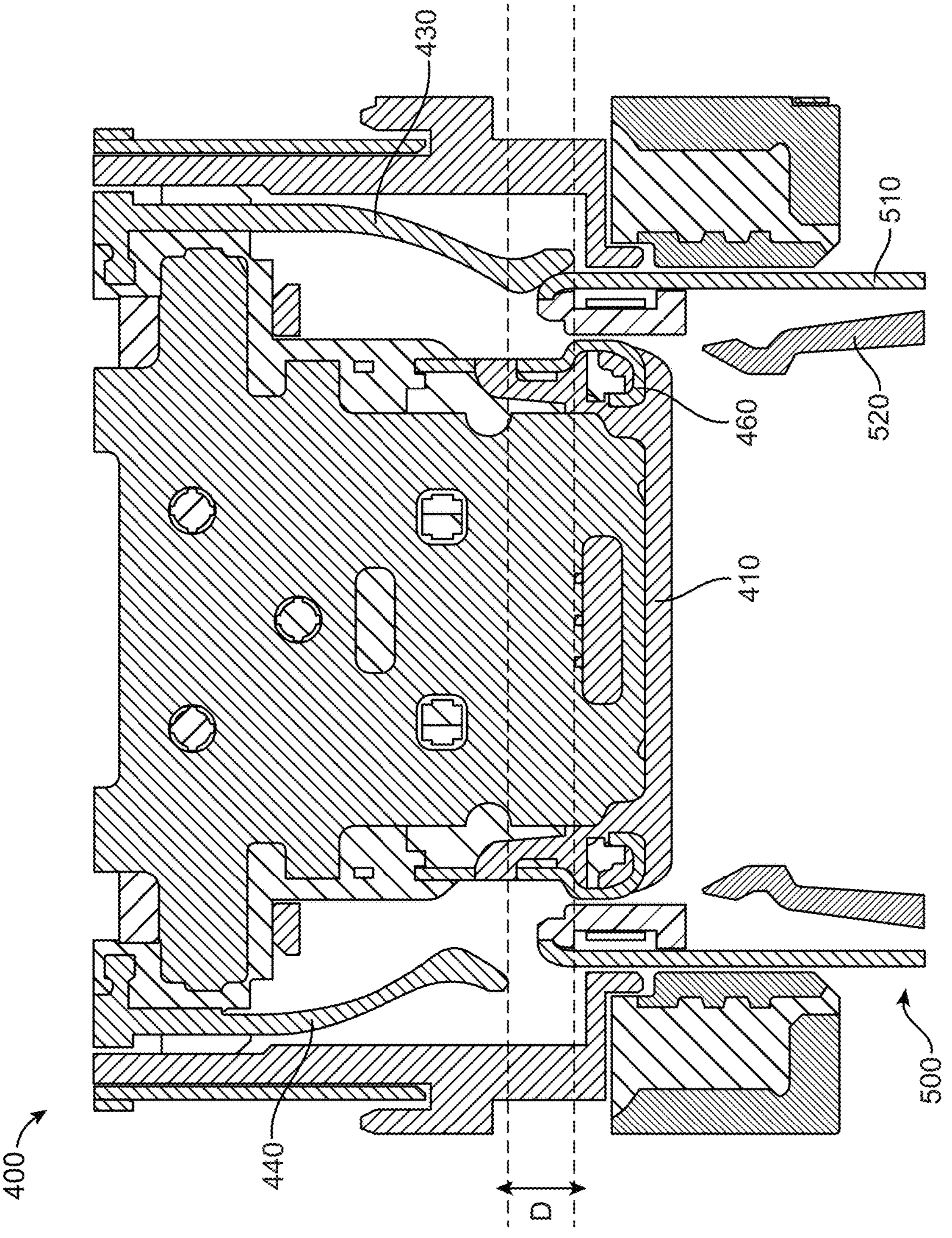
FIG. 5 illustrates a mating sequence of a connector insert and connector receptacle according to embodiments of the present invention.

FIG. 5 illustrates a mating sequence of a connector insert and connector receptacle according to embodiments of the present invention. As before, connector receptacle 400 can be connector receptacle 112, connector receptacle 122 (both shown in FIG. 1), or another connector receptacle consistent with an embodiment of the present invention. Connector insert 500 can be connector insert 132, connector insert 134 (both shown in FIG. 1), or another connector insert. Connector receptacle 400 can include side ground contact 430 and connection-detect contact 440. During insertion, shield 510 of connector insert 500 can engage side ground contact 430 before it engages connection-detect contact 440. During extraction, shield 510 of connector insert 500 can disconnect from side ground contact 430 after shield 510 disconnects from connection-detect contact 440. Similarly, contacts 420 (shown in FIG. 4) can connect to corresponding contacts (not shown) in connector insert 500 after shield 510 has engaged side ground contact 430 and contacts 420 can disconnect from corresponding contacts in connector insert 500 before shield 510 disconnects from side ground contact 430. This can help to prevent stray voltages from causing damage to circuits connected to or associated with connector receptacle 400 or connector insert 500. This sequence can be accomplished by positioning connection-detect contact 440 a distance D behind side ground contact 430. Side ground contacts 520 of connector insert 500 can physically and electrically contact side ground contacts 460 on tongue 410 during mating.

Connector interface circuitry (not shown) can be used to determine when connection-detect contact 440 is grounded. This can inform the interface circuitry that a connection to a corresponding connector has been made, even when power is not applied to the CC connection detection circuitry due to the presence of liquid. This can enable a message to be provided to a user that a connected device might not operate due to the presence of liquid in the connector receptacle.

Figure 6B:
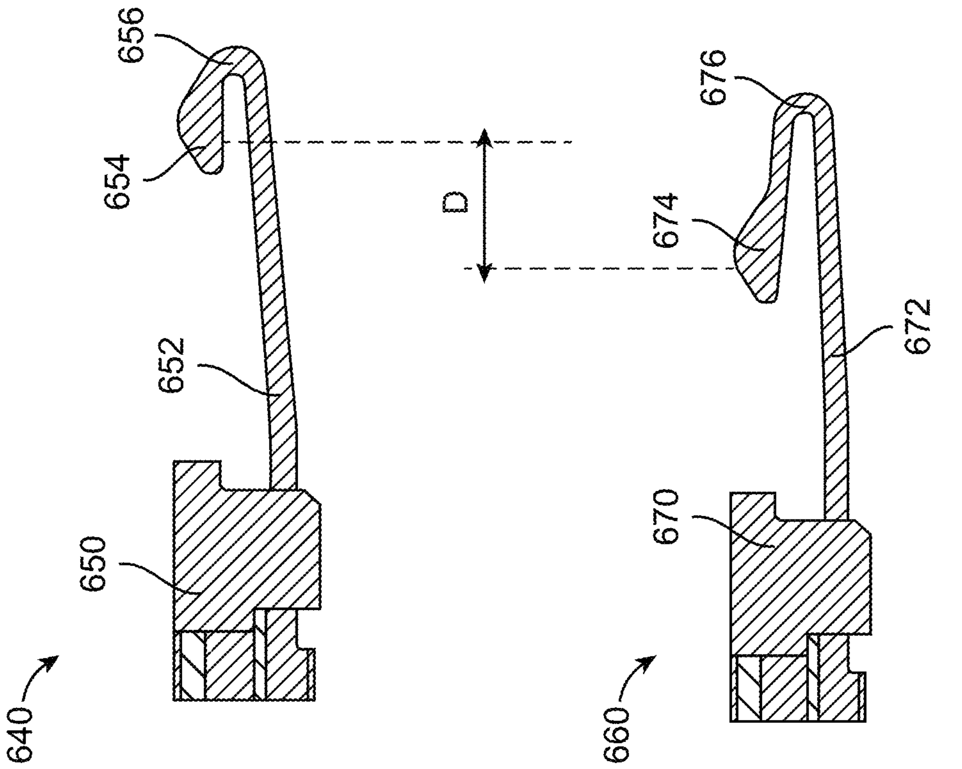
FIG. 6A through FIG. 6C illustrate contacts that can be used as side ground contacts and connection-detect contacts according to embodiments of the present invention.
Figure 6A:
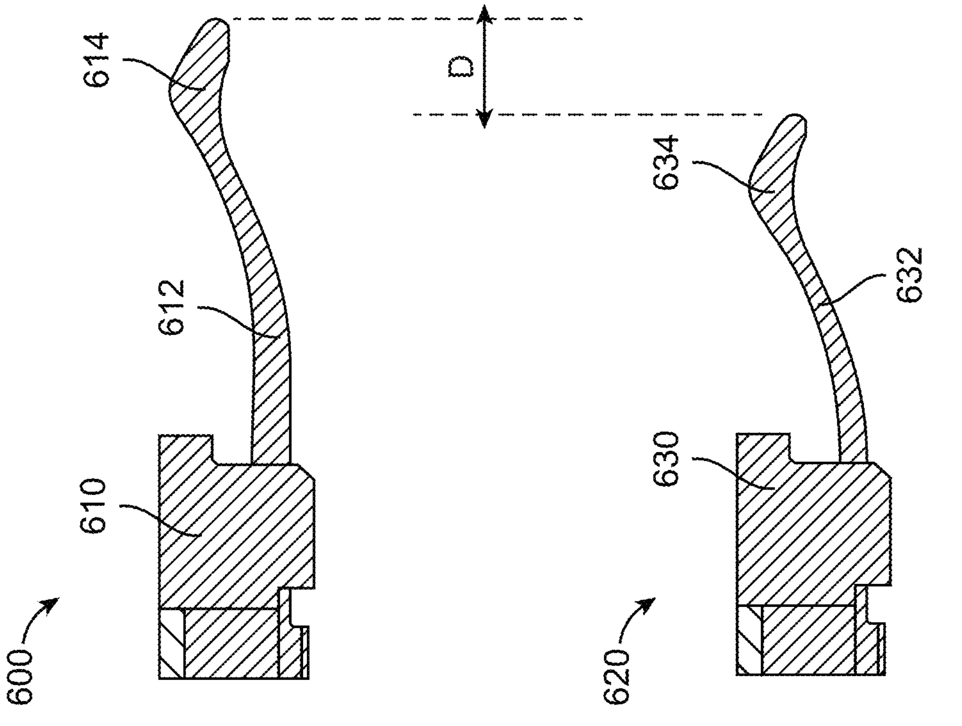
Figure 6C:
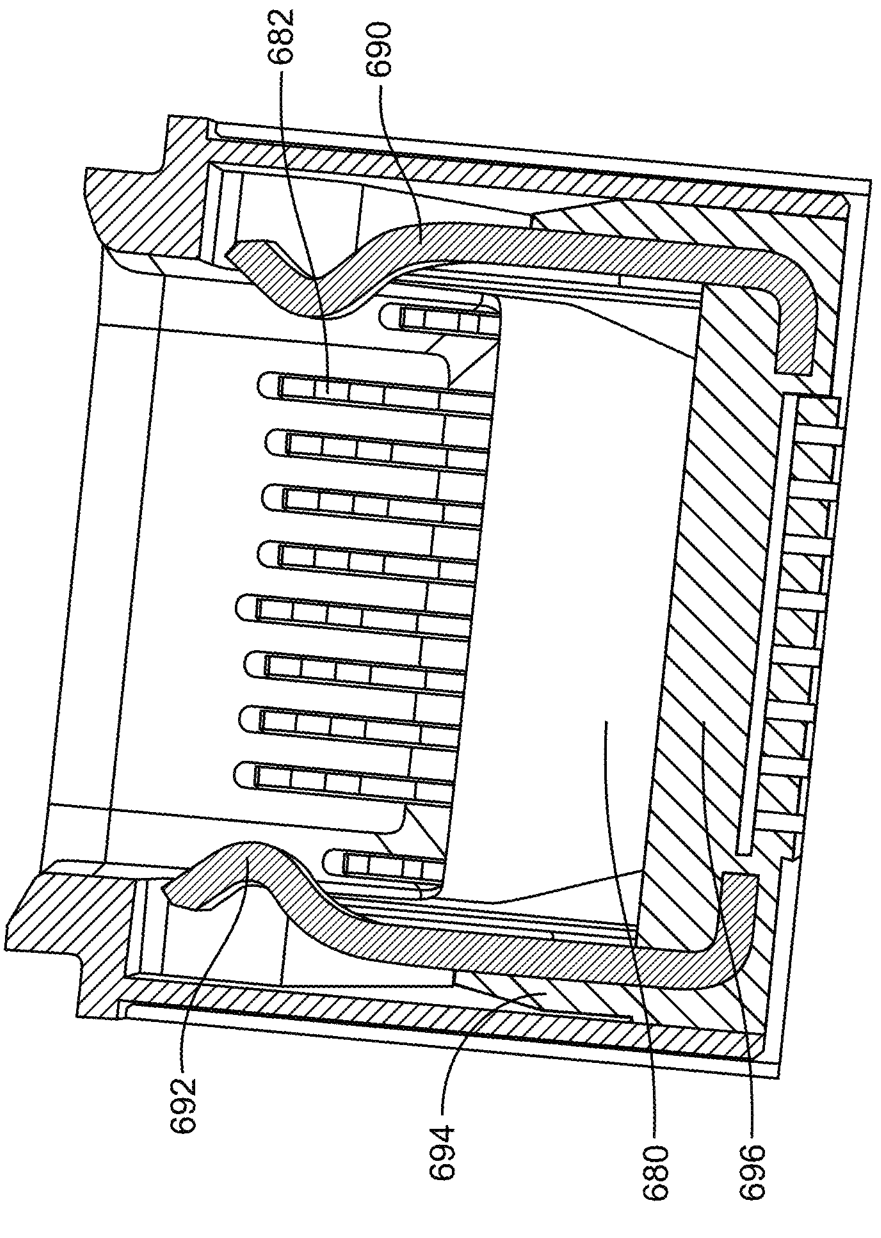

FIG. 6A, FIG. 6B, and FIG. 6C illustrate contacts that can be used as side ground contacts and connection-detect contacts according to embodiments of the present invention. FIG. 6A illustrates side ground contact 600 and connection-detect contact 620. Side ground contact 600 and connection-detect contact 620 can be used as side ground contact 430 (shown in FIG. 4A) and connection-detect contact 440 (shown in FIG. 4B), respectively. As before, side ground contact 600 can be longer than connection-detect contact 620 by length D. Side ground contact 600 can include base 610 that can be secured in a housing of a connector receptacle, beam 612, and contacting portion 614, which can connect to shield 510 of connector insert 500 (shown in FIG. 5.) Connection-detect contact 620 can include base 630 that can be secured in a housing connector receptacle, beam 632, and contacting portion 634, which can connect to shield 510 of connector insert 500.

FIG. 6B illustrates side ground contact 640 and connection-detect contact 660. Side ground contact 640 can include base 650 that can be secured in the housing of a connector receptacle, beam 652, and contacting portion 654, which can connect to shield 510 of connector insert 500 (shown in FIG. 5.) Beam 652 can include bend 656 to increase in overall beam length. This increase in beam length can help to prevent a permanent set that could otherwise reduce the normal contacting force, and therefore the effectiveness, of side ground contact 640. Connection-detect contact 660 can include base 670 that can be secured in a housing of a connector receptacle, beam 672, and contacting portion 674, which can connect to shield 510 of connector insert 500. Beam 672 can include bend 676 to increase in overall beam length. This increase in beam length can help to prevent a permanent set the could otherwise reduce the normal contacting force, and therefore the effectiveness, of connection-detect contact 660.

These and other embodiments of the present invention can employ reinforced space-saving side ground contacts to help increase a retention force of the side ground contacts and to reduce a width of a connector receptacle. These side ground contacts can be reinforced with tabs that extend along a portion of an outward facing side of the side ground contacts. These tabs can be a portion of a housing for a connector receptacle. The tabs can provide reinforcement that can increase a retention force of the side ground contacts. The tabs can limit a possible deflection of the side ground contacts, thereby allowing the receptacle to have a reduced width.

FIG. 6C illustrates side ground contacts, though either or both of the side ground contacts can be replaced by a connection detection contact. Connector receptacle 680 can support contacts 682. Connector receptacle 680 can include side ground contacts 690. Side ground contacts 690 can include contacting portions 692 that can form ground connections with a ground ring or other portion of a connector insert. Side ground contacts 690 can be reinforced by tabs 694, which can be a portion of connector receptacle housing 696, though tabs 694 can be other portions of plastic, metal, or other materials. Tabs 694 can be adjacent to a portion of an outside edge of side ground contacts 690 and can limit an amount of deflection by side ground contacts 690.

In conventional connector receptacles, side ground contacts 690 can consume an amount of lateral space in connector receptacle 680 in order for the beams of side ground contacts 690 to be angled enough to provide an adequate retention force. The reinforcement provided by tabs 694 can provide an increase in retention force without having to consume a large amount of lateral space. This can allow the use of a narrower connector receptacle.

Side ground contacts 690 can both be side ground contacts, or one or more of side ground contacts can be replaced by a connection-detect contact. The side ground contacts 690 can have the same or different lengths. For example, where a connection-detect contact replaces a side ground contact 690, the contacting portion 692 on the remaining side ground contact 690 can be placed close to a front opening of connector receptacle 680 than the contacting portion of the connection-detect contact.

In this example connector receptacle 680 can be a Lightning™ connector and contacting portions 692 of side ground contacts 690 can physically and electrically contact indentations on sides of a Lightning™ connector insert. In these and other embodiments, similar side ground contacts 690 and tabs 694 can be used in a USB Type-C connector receptacle and contacting portions 692 can make contact with an outside of shield 510 of connector insert 500 (shown in FIG. 5.)

Again, liquid can occasionally enter a connector receptacle, such as connector receptacle 112, connector receptacle 122 (both shown in FIG. 1), or other connector receptacle. For example, handheld computer device 110 (shown in FIG. 1) can be used during exercise and sweat can enter connector receptacle 112. A liquid can be spilled and can enter connector receptacle 112 on handheld computing device 110 or connector receptacle 122 on portable computing device 120 (shown in FIG. 1.) Handheld computing device 110 can be inadvertently submerged, or other events can happen to either handheld computing device 110 or portable computing device 120. This liquid can cause corrosion of contacts in connector receptacle 112, connector receptacle 122, or other connector receptacle.

This corrosion can be accelerated in the presence of an electric field. Such a field can arise in a USB Type-C connector receptacle that is in a connected state, where a VBUS contact can be 5 Volts or higher while an adjacent CC contact (or SBU contact) can be near ground. This voltage difference can cause liquid on a tongue between a VBUS contact and a CC contact to form a bridge through which current can flow. The metal of the VBUS contact and a CC contact can dissolve into free ions, which can migrate from one contact to another forming dendrites or other metal particle deposition between contacts. This migration can lead to shorts between adjacent contacts. The dissolved metal ions can move and form oxides, which can result in opens or high-impedance at contacts due to surface residue or partial contact material loss. Accordingly, it can be desirable to be able to detect liquid on a tongue of a connector receptacle such that mitigating steps can be taken. Examples of contacts that can be used to detect liquid on a tongue of a connector receptacle are shown in the following figures.

Figure 7:
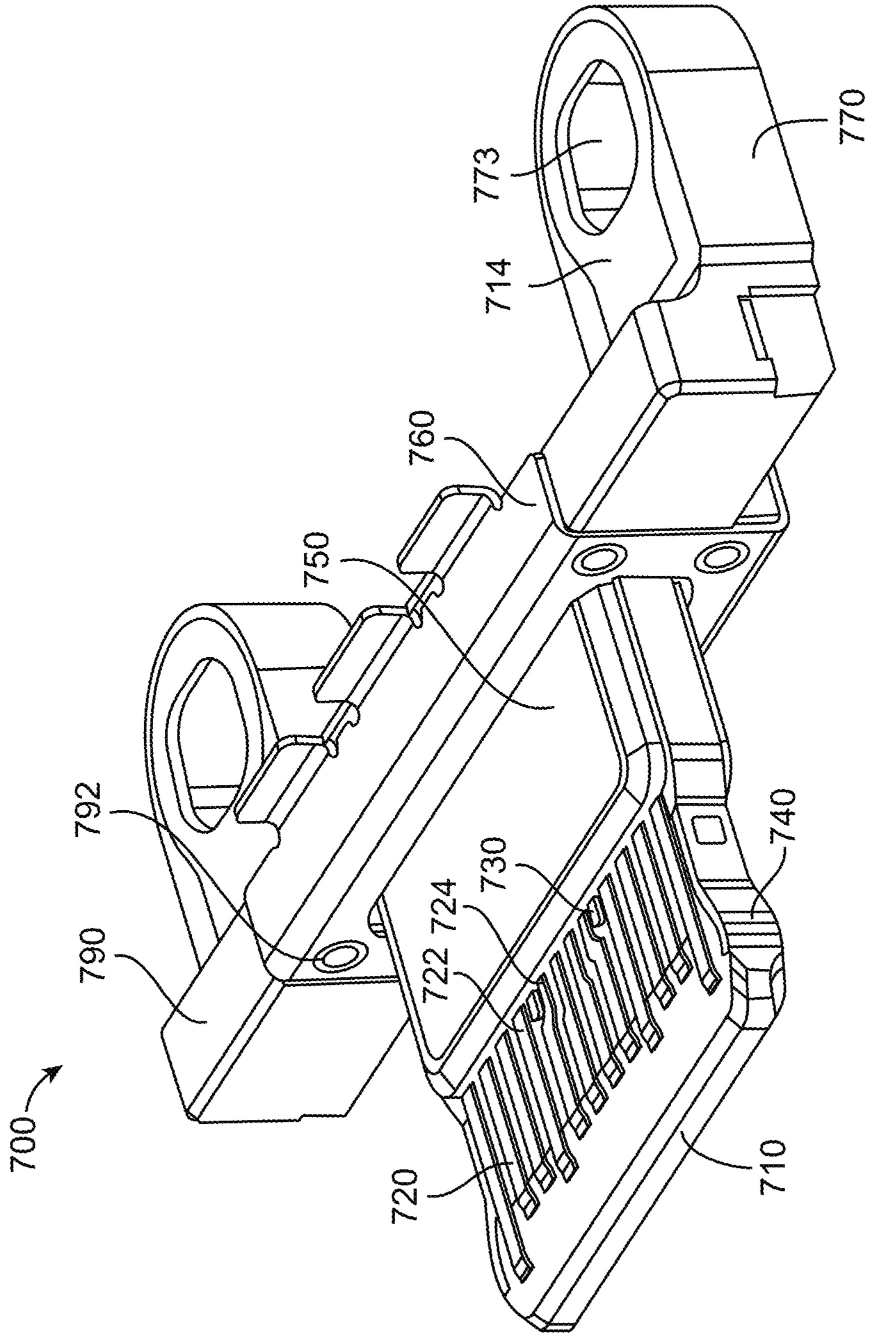
FIG. 7 illustrates a tongue assembly for a connector receptacle according to an embodiment of the present invention.

FIG. 7 illustrates a tongue assembly for a connector receptacle according to an embodiment of the present invention. Tongue assembly 700 can be used in connector receptacle 112, connector receptacle 122 (both shown in FIG. 1), or other connector receptacle according to an embodiment of the present invention. Tongue assembly 700 can include tongue 710 supporting power and data contacts 720 and liquid-detect contacts 730 on a top and bottom side. Tongue 710 can further support side ground contacts 740 and EMI or ground pad 750. Tongue 710 can be supported by bracket 790. Bracket 790 can support front shield 760. Attachments can be made to front shield 760 at locations 792. Bracket 790 can include tabs 770 having openings 773 for a fastener (not shown) to secure tongue assembly 700 to an enclosure of an electronic device, such as handheld computing device 110, portable computing device 120, or other electronic device. Tabs 770 can include metallized portion 714, which can ground the fasteners.

A common corrosion path in a universal serial bus type C connector can be from VBUS contact 722 to adjacent CC contact 724. Accordingly, embodiments of the present invention can include a liquid-detect contact 730 between VBUS contact 722 and CC contact 724 on each of the top and bottom sides of tongue 710. Specifically, liquid-detect contacts 730 can be located between VBUS contact 722 and CC contact 724. CC contact 724 can be thinned and routed around a liquid-detect contact 730, while VBUS contact 722 can remain full-sized. This can prevent an increase in series impedance of VBUS contact 722. This allows liquid to be detected at the most vulnerable positions on tongue 710. Liquid-detect contacts can also be placed between a VBUS contact 727 and a SBU contact 726 (both shown in FIG. 10) on a top and bottom of tongue 710. While four liquid-detect contacts 730 are shown in this example, other numbers of liquid-detect contacts 730 can be included on connector tongues consistent with an embodiment of the present invention. For example, one, two, three, four, or more than four liquid-detect contacts 730 can be included on tongue 710 or elsewhere in a connector receptacle housing tongue 710.

Liquid-detect contacts 730 can be short in length, extending only a short distance beyond EMI or ground pad 750 on a top of tongue 710 and EMI or ground pad 754 (shown in FIG. 8) on a bottom of tongue 710. In this way, liquid-detect contacts 730 do not connect to any of the contacts (not shown) of a connector insert, such as connector insert 500 (shown in FIG. 5) when connector insert 500 is inserted into a connector receptacle housing tongue assembly 700.

Connector receptacle interface circuit 2320 (shown in FIG. 23) can provide a voltage waveform to liquid-detect contacts 730 to determine the presence of liquid using Electrochemical-Impedance Spectroscopy (EIS.) The voltage waveform can be a sinewave, square wave, or other voltage waveform. When liquid is present between liquid-detect contact 730 and a second contact, such as VBUS contact 722 or CC contact 724 (or such as VBUS contact 727 or SBU contact 726), a current can result that can indicate a change in capacitance and resistance seen at liquid-detect contact 730. That is, connector receptacle interface circuitry can detect the magnitude of this current and any phase shift as compared to the applied voltage, and from that determine a change in capacitance and resistance seen at liquid-detect contact 730. From the changes in capacitance and resistance, the presence of liquid and information regarding the type of liquid that is present can be determined. Further details of this can be found in U.S. Pat. No. 11,658,443, issued May 23, 2023, titled LIQUID DETECTION AND CORROSION MITIGATION, which is incorporated by reference.

Figure 8:
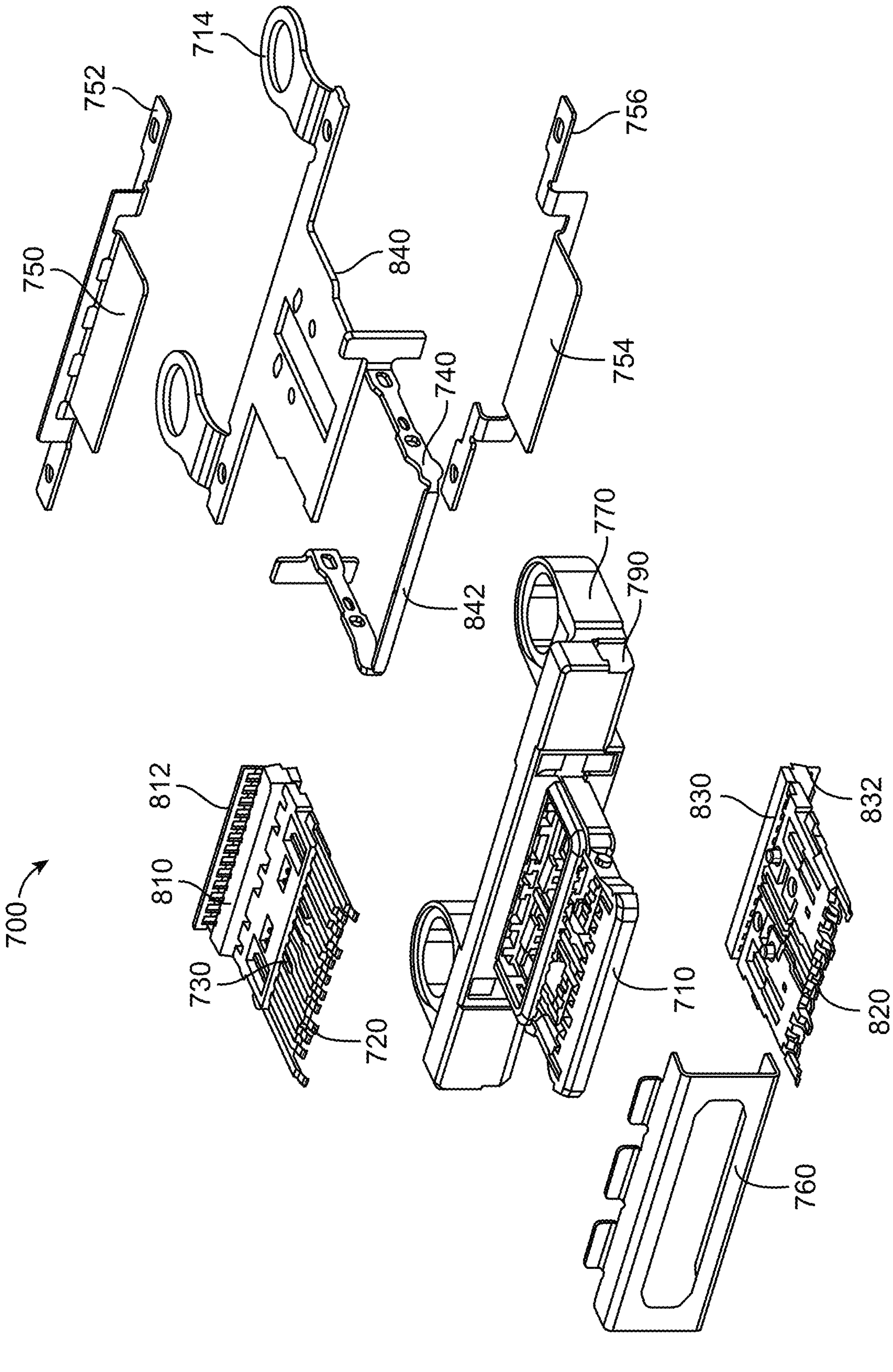
FIG. 8 is an exploded view of the tongue assembly of FIG. 7.

FIG. 8 is an exploded view of the tongue assembly of FIG. 7. In tongue assembly 700, contacts 720 and liquid-detect contacts 730 can be supported by top housing 810. Contacts 820 and liquid-detect contacts (not shown but having the same configuration as liquid-detect contacts 730) can be supported by bottom housing 830. Top housing 810 and bottom housing 830 can be insert molded around their respective contacts. Carriers 812 and 832 can be removed after molding. Center plate 840 can be placed between top housing 810 and bottom housing 830. Tongue 710 can be molded around top housing 810, bottom housing 830, and center plate 840. Center plate 840 can include metallized portion 714. Tongue 710 can be supported by bracket 790 having tabs 770. Reinforcement frame 842 can be placed around sides in front of tongue 710 and can form side ground contacts 740. EMI or ground pad 750 can be attached using crossbar 752. EMI or ground pad 754 can be attached using crossbar 756. Front shield 760 can be attached to reinforcement frame 842, crossbar 752, and crossbar 756 at locations 792 (shown in FIG. 7.)

Figure 9:
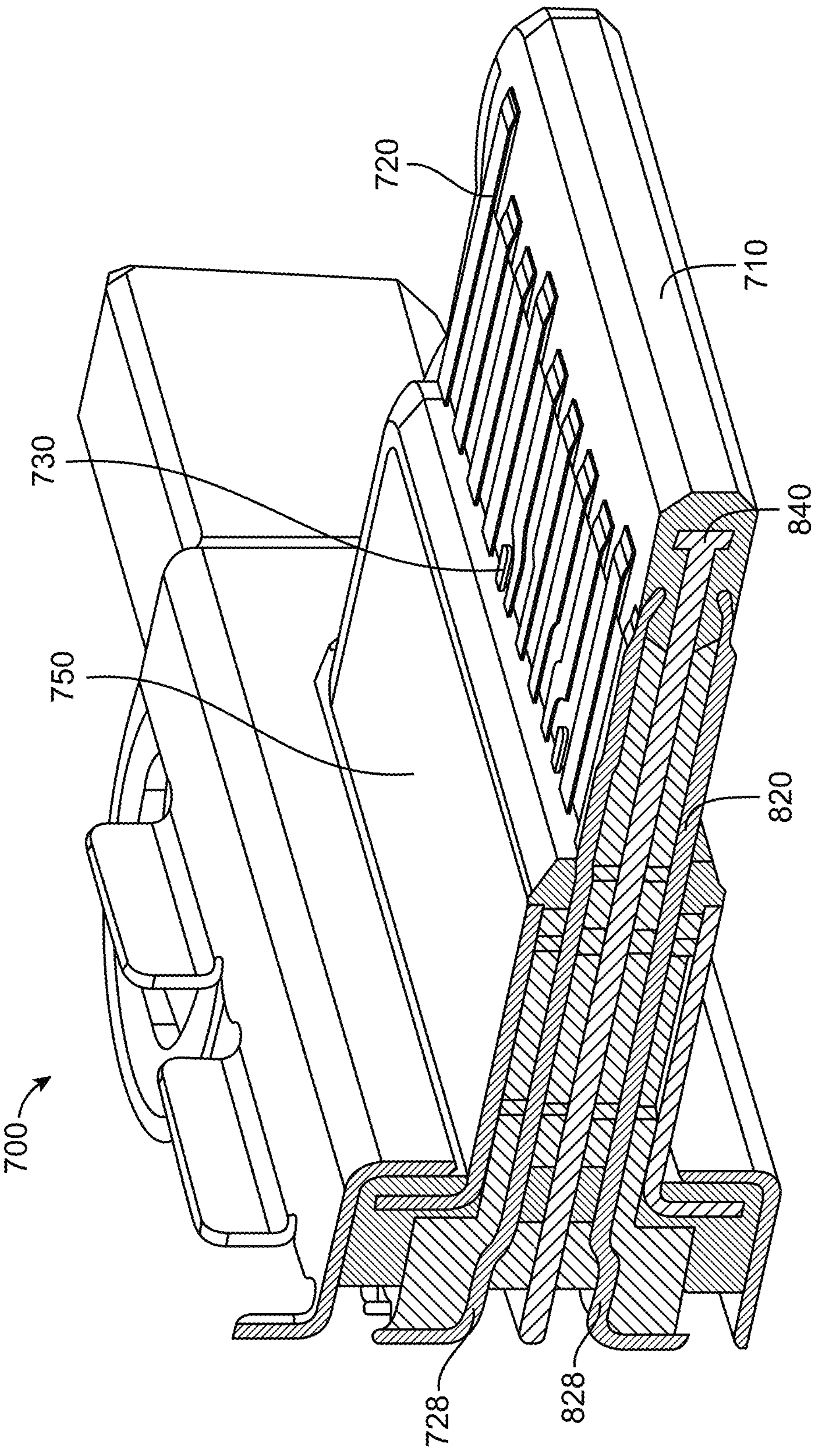
FIG. 9 is a cutaway side view of the tongue assembly of FIG. 7.

FIG. 9 is a cutaway side view of the tongue assembly of FIG. 7. Tongue assembly 700 can include tongue 710 supporting power and data contacts 720 on a top side and power and data contacts 820 on a bottom side. Liquid-detect contacts 730 can also be located on a top side of tongue 710, while corresponding liquid-detect contacts (not shown) can be supported on a bottom side of tongue 710. Tongue 710 can further support EMI or ground pad 750 on a top side and EMI or ground pad 754 (shown in FIG. 8) on a bottom side. Contacts 720 can include widened portion 728, while contacts 820 can include widened portion 828. This widening can provide additional space between portions 728 and portions 828 of contacts 720 and contacts 820. This additional space can help to reduce cross-talk between contacts 720 and contacts 820. Center plate 840 can further reduce cross-talk between contacts 720 and contacts 820.

Figure 10:
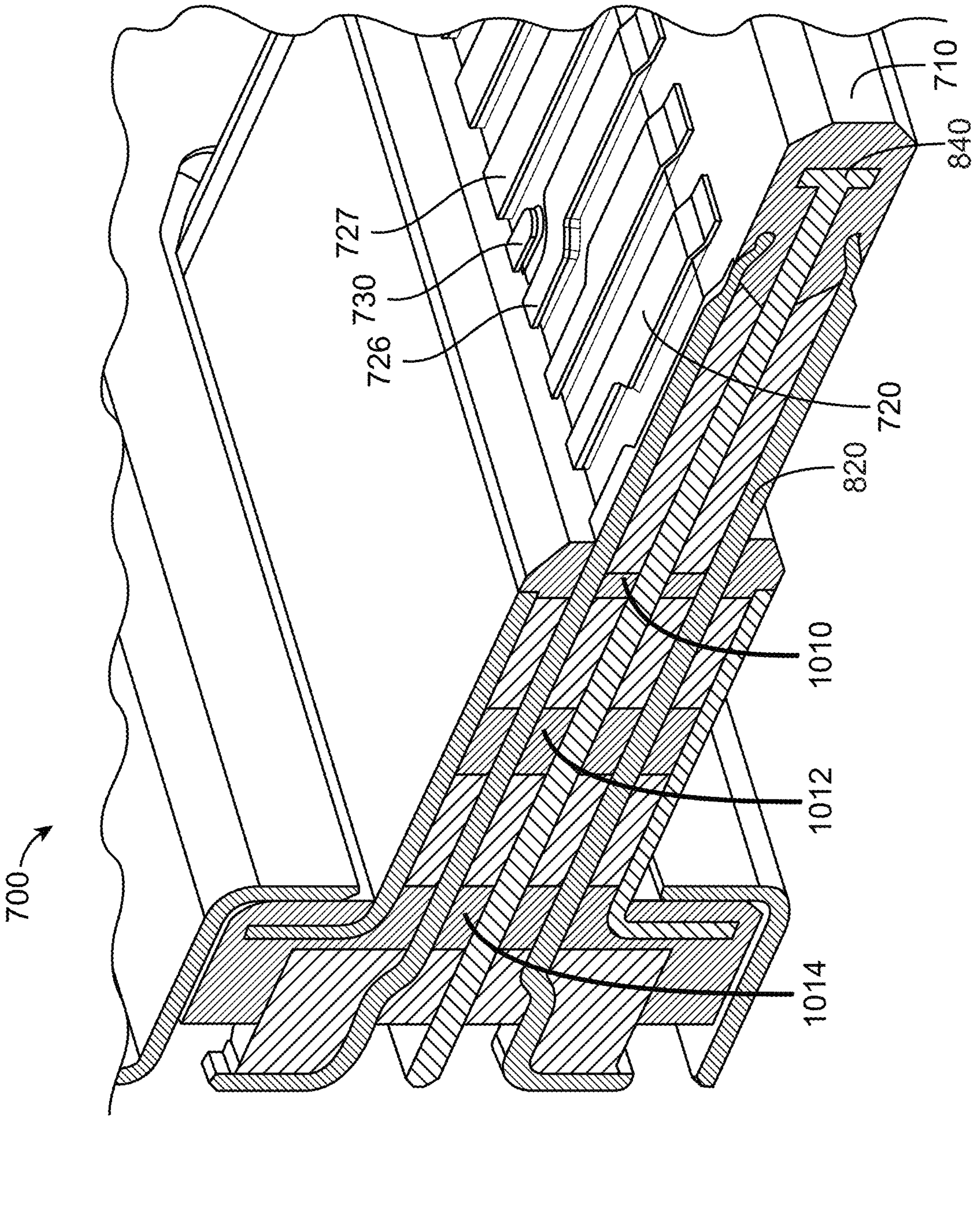
FIG. 10 is another cutaway side view of the tongue assembly of FIG. 7.

FIG. 10 is another cutaway side view of the tongue assembly of FIG. 7. Tongue assembly 700 can include contacts 720 and contacts 820 on tongue 710. Tongue assembly 700 can further include liquid-detect contacts 730 on a top side of tongue 710, and corresponding liquid-detect contacts (not shown) on a bottom side of tongue 710.

VBUS contact 727 and SBU contact 726 can be thinned and routed around liquid-detect contacts 730. This can be accomplished by forging contacts 720 so that they are narrower in a lateral direction. This narrowness can help to increase the pitch of contacts 720 that is necessitated by the inclusion of additional liquid-detect contacts 730. As before, VBUS contact 727 can remain full-sized to prevent an increase in series resistance for VBUS contact 727.

Again, in these and other embodiments of the present invention, it can be desirable to prevent leakage through tongue 710 into an electronic device. Accordingly, contacts 720 and contacts 820, as well as liquid-detect contacts 730, the liquid-detect contacts on the bottom side of tongue 710, and center plate 840 can be sealed. For example, insert molding section 1010, insert molding section 1012, and insert molding section 1014 can form seals around these contacts to prevent liquid ingress through tongue 710.

Figure 11:
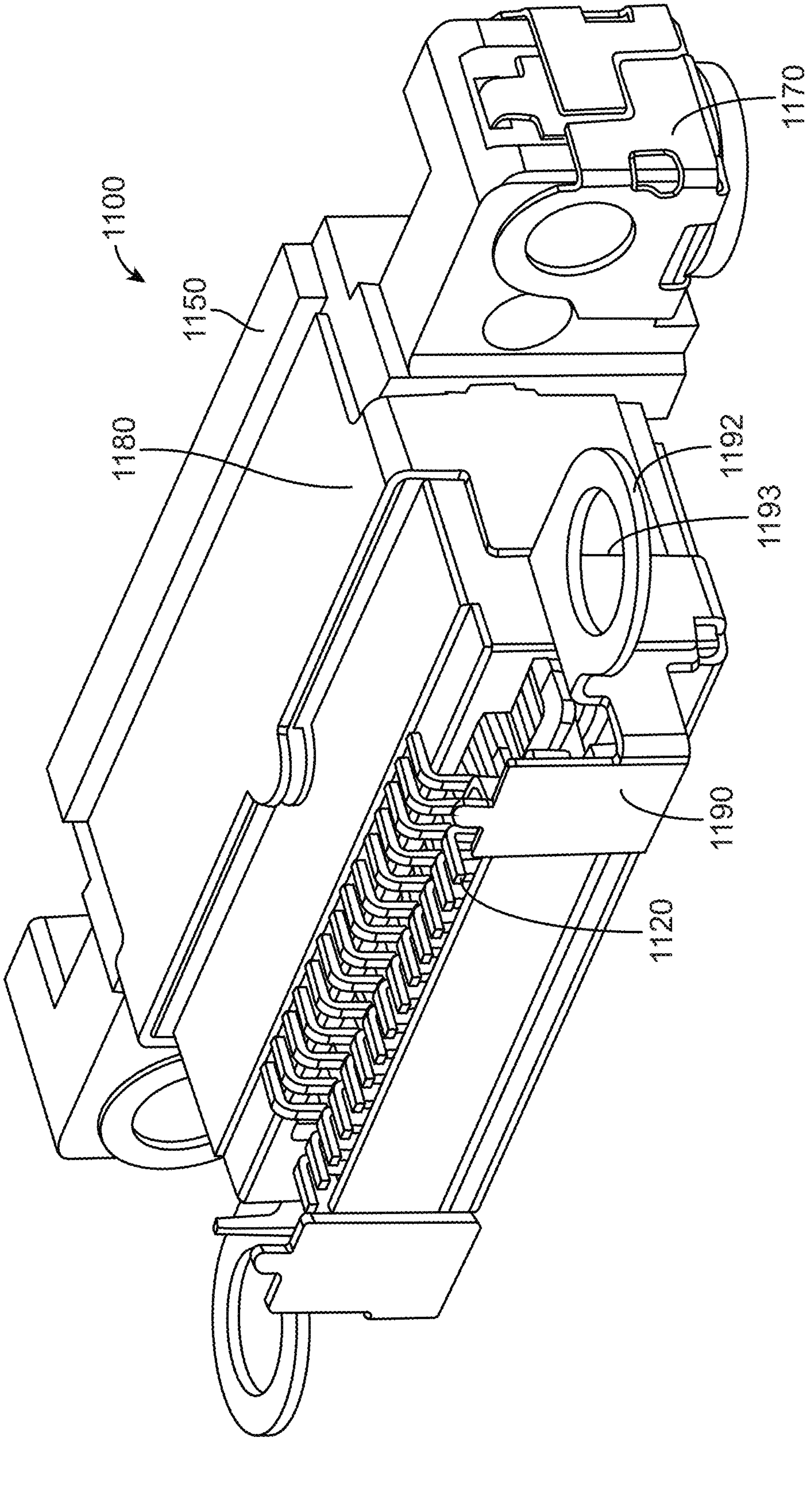
FIG. 11 illustrates another connector receptacle according to an embodiment of the present invention.

FIG. 11 illustrates another connector receptacle according to an embodiment of the present invention. Connector receptacle 1100 can include housing 1150 supporting a number of power and data contacts 1120. Connector receptacle 1100 can be shielded by side shield 1170, bottom shield 1180, and back shield 1190. Back shield 1190 can include tabs 1192 having openings 1193 for fasteners to secure connector receptacle 1100 to an enclosure of handheld computing device 110, portable computing device 120 (both shown in FIG. 1), or other electronic device.

Figure 12:
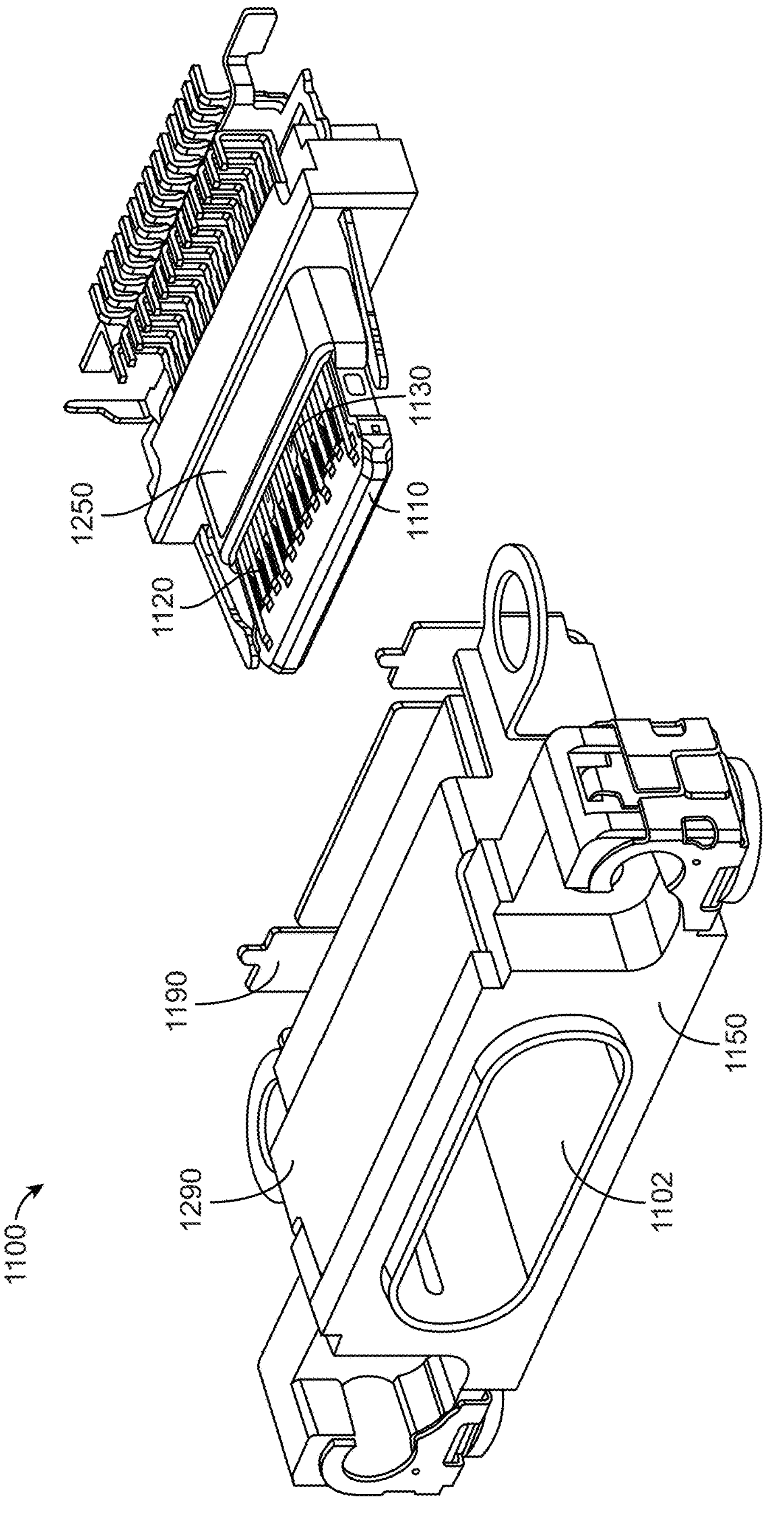
FIG. 12 illustrates a partially exploded view of the connector receptacle of FIG. 11.

FIG. 12 illustrates a partially exploded view of the connector receptacle of FIG. 11. Connector receptacle 1100 can include housing 1150 having passage 1102 to provide access to tongue 1110. Housing 1150 can be shielded by back shield 1190 and top shield 1290. Tongue 1110 can support power and data contacts 1120 and liquid-detect contacts 1130 on a top and bottom side. Power and data contacts 1120 and liquid-detect contacts 1130 can be the same or similar to power and data contacts 720 and liquid-detect contacts 730 (shown in FIG. 7) and can operate with the same or similar connector receptacle interface circuit 2320 (shown in FIG. 23.) While four liquid-detect contacts 1130 are shown in this example, other numbers of liquid-detect contacts can be included on connector tongues consistent with an embodiment of the present invention. For example, one, two, three, four, or more than four liquid-detect contacts 1130 can be included on tongue 1110 or elsewhere in connector receptacle 1100 or other connector receptacle according to an embodiment of the present invention. Tongue 1110 can further support EMI or ground pad 1250 on a top side and EMI or ground pad 1254 (shown in FIG. 13) on a bottom side.

Liquid-detect contacts 1130 can be short in length, extending only a short distance beyond EMI or ground pad 1250 on a top of tongue 1110 and EMI or ground pad 1254 (shown in FIG. 13) on a bottom of tongue 1110. In this way, liquid-detect contacts 1130 do not connect to any of the contacts (not shown) of a connector insert, such as connector insert 500 (shown in FIG. 5) when connector insert 500 is inserted into a connector receptacle that houses connector receptacle 1100.

Connector receptacle interface circuit 2320 (shown in FIG. 23) can provide a voltage waveform to liquid-detect contacts 1130 to determine the presence of liquid using Electrochemical-Impedance Spectroscopy (EIS.) The voltage waveform can be a sinewave, square wave, or other voltage waveform. When liquid is present between liquid-detect contact 1130 and a second adjacent or nearby contact, such as a VBUS contact or a CC contact, a current can result that can indicate a change in capacitance and resistance seen at liquid-detect contact 1130. That is, connector receptacle interface circuit 2320 can detect the magnitude of this current and any phase shift as compared to the applied voltage, and from that determine a change in capacitance and resistance seen at liquid-detect contact 1130. From the changes in capacitance and resistance, the presence of liquid and information regarding the type of liquid that is present can be determined.

Figure 13:
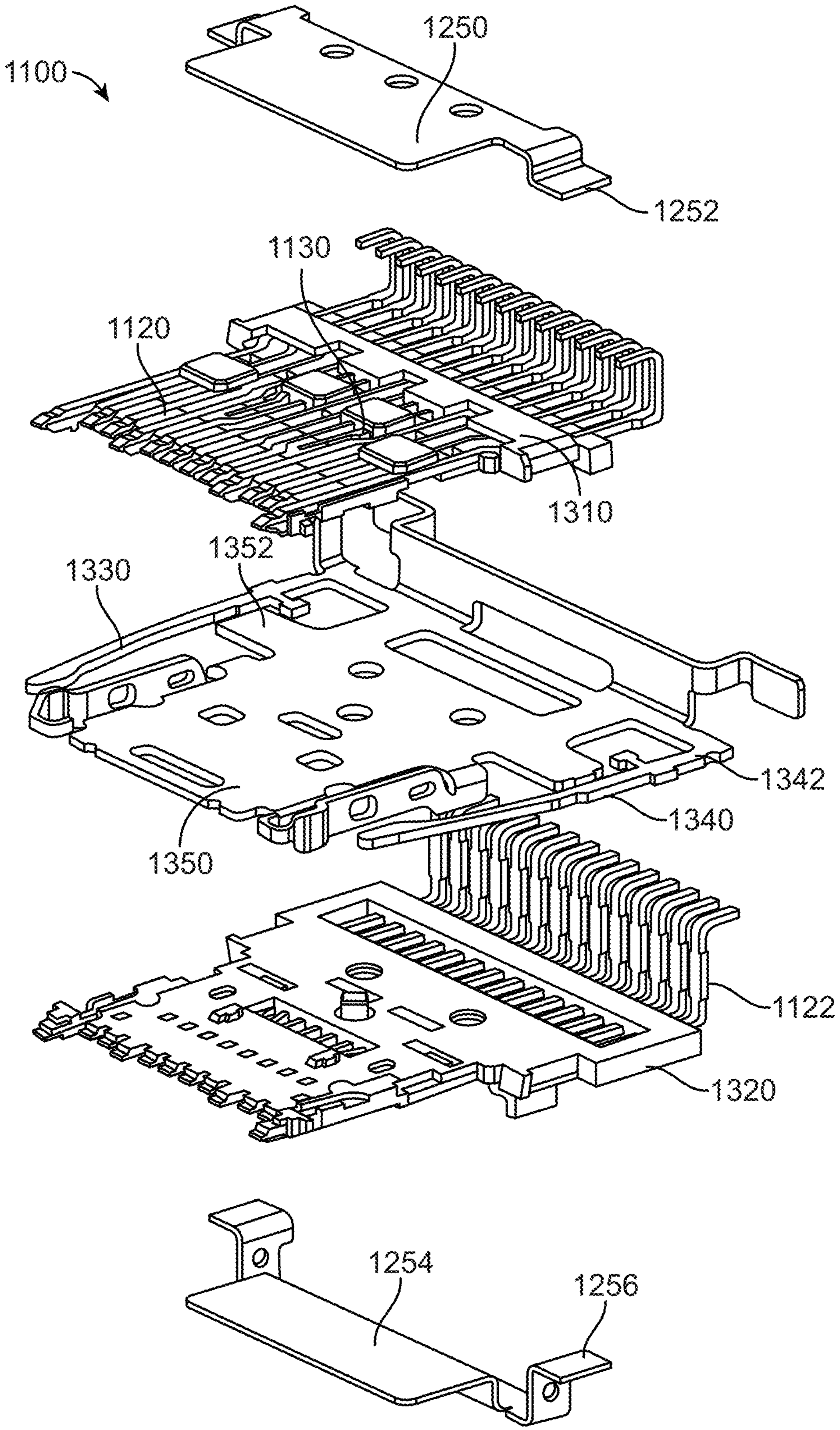
FIG. 13 is an exploded view of the tongue of the connector receptacle of FIG. 11.

FIG. 13 is an exploded view of a tongue of the connector receptacle of FIG. 11. Tongue 1110 can include top housing 1310 injection molded around power and data contacts 1120 and liquid-detect contacts 1130. Bottom housing 1320 can be insert molded around contacts 1122 and liquid-detect contacts (not shown) that can be the same or similar to liquid-detect contacts 1130. Center plate 1350 can be positioned between top housing 1310 and bottom housing 1320. Center plate 1350 can be attached to side ground contact 1330. Center plate 1350 can be attached to connection-detect contact 1340. Accordingly, connection-detect contact 1340 can be detached from center plate 1350 (singulated) at or near location 1342 during assembly. EMI or ground pad 1250 and EMI or ground pad 1254 can be attached to center plate 1350 at tabs 1352 using tabs 1252 and 1256, respectively. Tongue 1110 can be injection molded either before or after EMI or ground pad 1250 and EMI or ground pad 1254 are attached.

Figure 14:
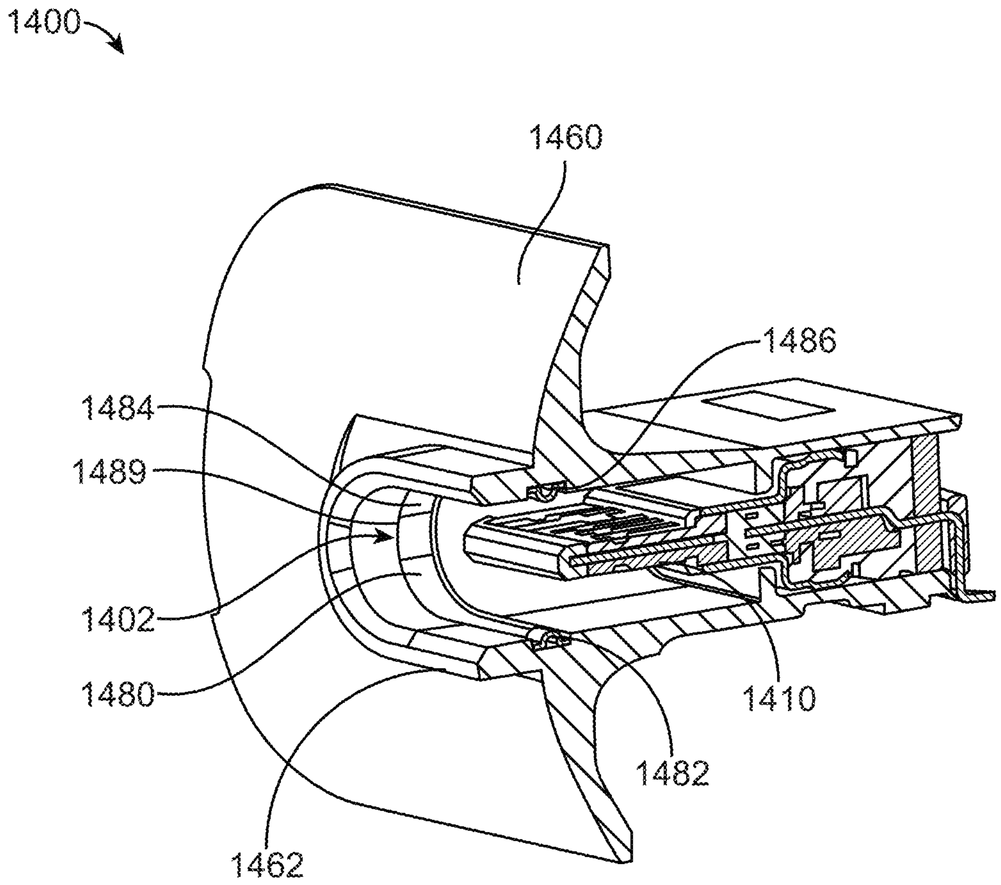
FIG. 14 illustrates another connector receptacle according to an embodiment of the present invention.

FIG. 14 illustrates another connector receptacle according to an embodiment of the present invention. Connector receptacle 1400 can include tongue 1410 located in tunnel 1462. Tunnel 1462 can form passage 1402 for providing access to tongue 1410 by a corresponding connector insert, such as connector insert 132, connector insert 134 (both shown in FIG. 1), or other connector insert. Flange 1460 can extend from tunnel 1462. Flange 1460 can be located behind an enclosure for handheld computing device 110, portable computing device 120, or other electronic device. Flange 1460 can provide reinforcement for connector receptacle 1400. Ground contact 1480 and ground contact 1484 can be located in corresponding groove 1489 in tunnel 1462. Ground contacts 1480 can include contacting portion 1482, and ground contact 1484 can include contacting portion 1486.

In this example, connector receptacle 1400 can be used primarily for charging and for some limited data communications, such as software or firmware updates. Accordingly, high-speed transmit and receive contact pairs (not shown) that are normally located on a connector tongue such as tongue 1410 can be omitted. This can provide space for liquid-detection contacts. In this example, four liquid-detect contacts 1430 can be included. Two liquid-detect contacts 1430 can be included on the top side, while two additional liquid-detect contacts 1430 can be included on a bottom side of tongue 1410, though other numbers of liquid-detect contacts 1430 can be included, for example, one, two, three, four, or more than four liquid-detect contacts 1430 can be included on tongue 1410 or elsewhere in connector receptacle 1400 or other connector receptacle according to an embodiment of the present invention. An example is shown in the following figure.

Figure 15:
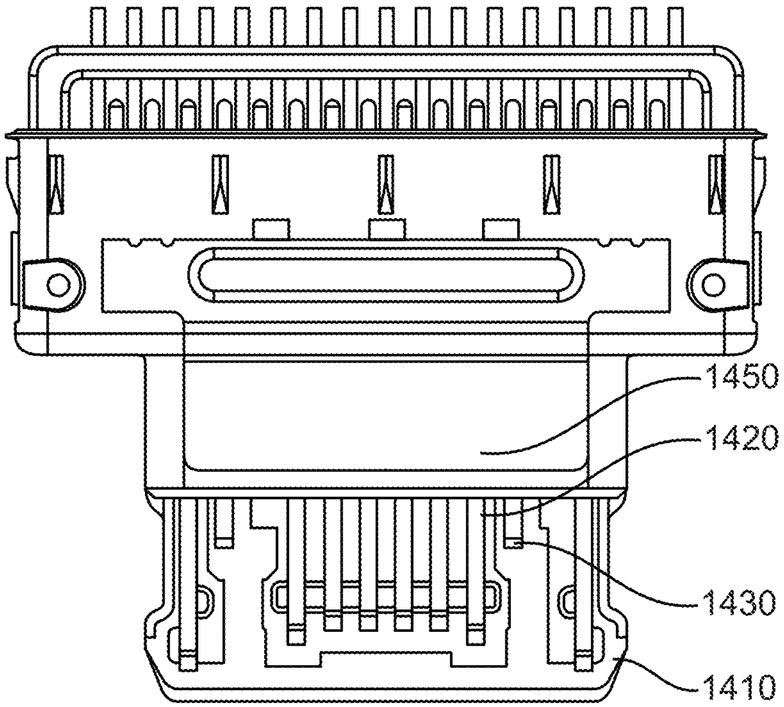
FIG. 15 illustrates a tongue that can be used for the connector in FIG. 14.

FIG. 15 illustrates a tongue that can be used for the connector in FIG. 14. Connector receptacle 1400 (shown in FIG. 14) can include tongue 1410. Tongue 1410 can include power and data contacts 1420 on a top and bottom side. Transmit and receive contact pairs (not shown) that might otherwise be included are omitted. Accordingly, liquid-detect contacts 1430 can take their positions in their absence. Two liquid-detect contacts 1430 can be included on the top side, while two additional liquid-detect contacts 1430 can be included on a bottom side of tongue 1410.

Liquid-detect contacts 1430 can be short in length, extending only a short distance beyond EMI or ground pad 1450 on a top of tongue 1410 and EMI or ground pad 1454 (shown in FIG. 17) on a bottom of tongue 1410. In this way, liquid-detect contacts 1430 do not connect to any of the contacts (not shown) of a connector insert, such as connector insert 500 (shown in FIG. 5) when connector insert 500 is inserted into a connector receptacle housing connector receptacle 1400 (shown in FIG. 14.)

Connector receptacle interface circuit 2320 can provide a voltage waveform to liquid-detect contacts 1430 to determine the presence of liquid using Electrochemical-Impedance Spectroscopy (EIS.) The voltage waveform can be a sinewave, square wave, or other voltage waveform. When liquid is present between liquid-detect contact 1430 and a second adjacent or nearby contact, such as a VBUS contact or a CC contact, a current can result that can indicate a change in capacitance and resistance seen at liquid-detect contact 1430. That is, connector receptacle interface circuit 2320 can detect the magnitude of this current and any phase shift as compared to the applied voltage, and from that determine a change in capacitance and resistance seen at liquid-detect contact 1430. From the changes in capacitance and resistance, the presence of liquid and information regarding the type of liquid that is present can be determined.

Figure 16:
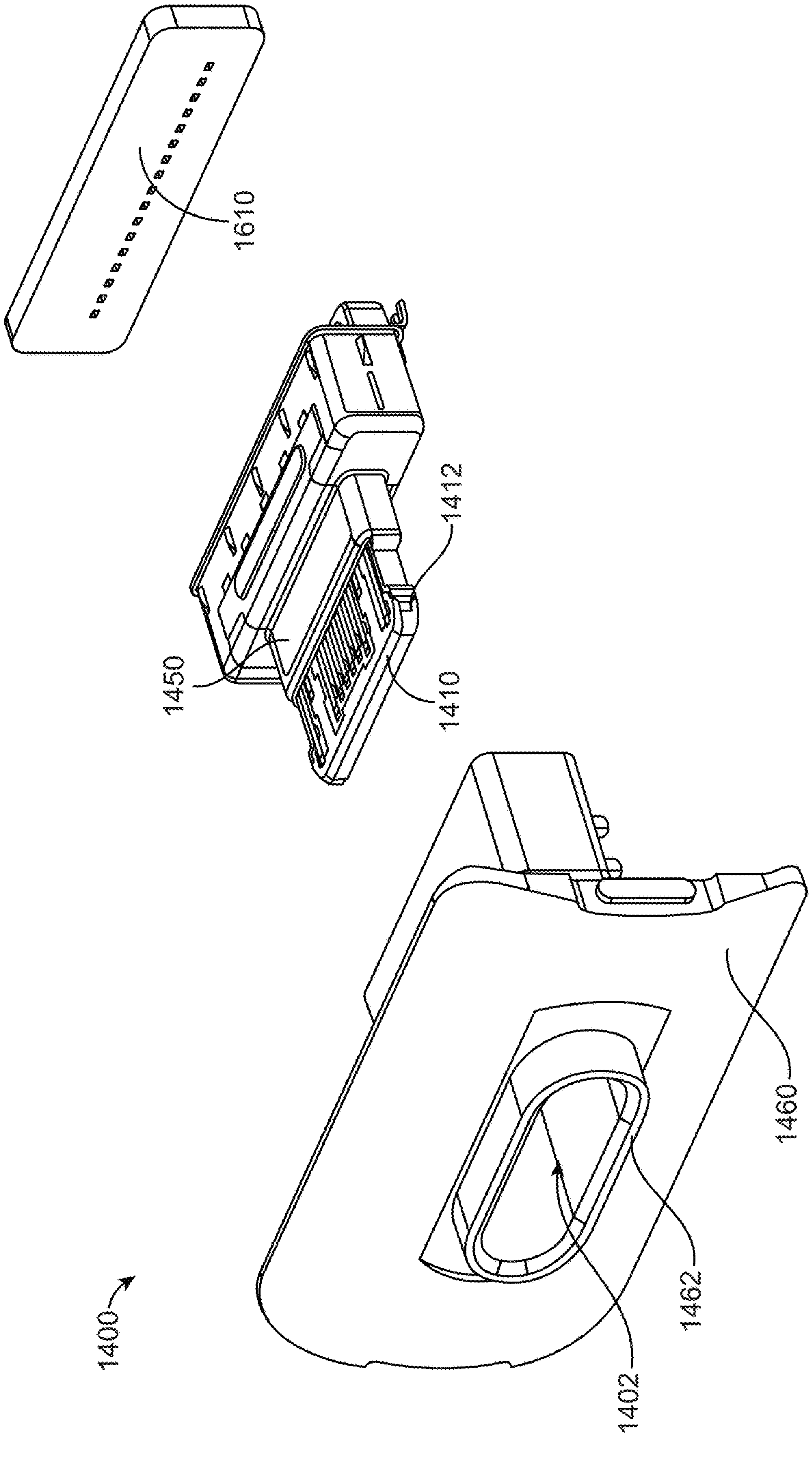
FIG. 16 illustrates a partially exploded view of the connector receptacle of FIG. 14.

FIG. 16 illustrates a partially exploded view of the connector receptacle of FIG. 14. Connector receptacle 1400 can include tunnel 1462. Tunnel 1462 can provide passage 1402 for access to tongue 1410. Flange 1460 can extend from tunnel 1462. Tongue 1410 can support side ground contacts 1412 and EMI or ground pads 1450. Glue board 1610 can be included to help attach connector receptacle 1400 in place in an electronic device during assembly. Alternatively, glue board 1610 can be removed before or after assembly.

Figure 17:
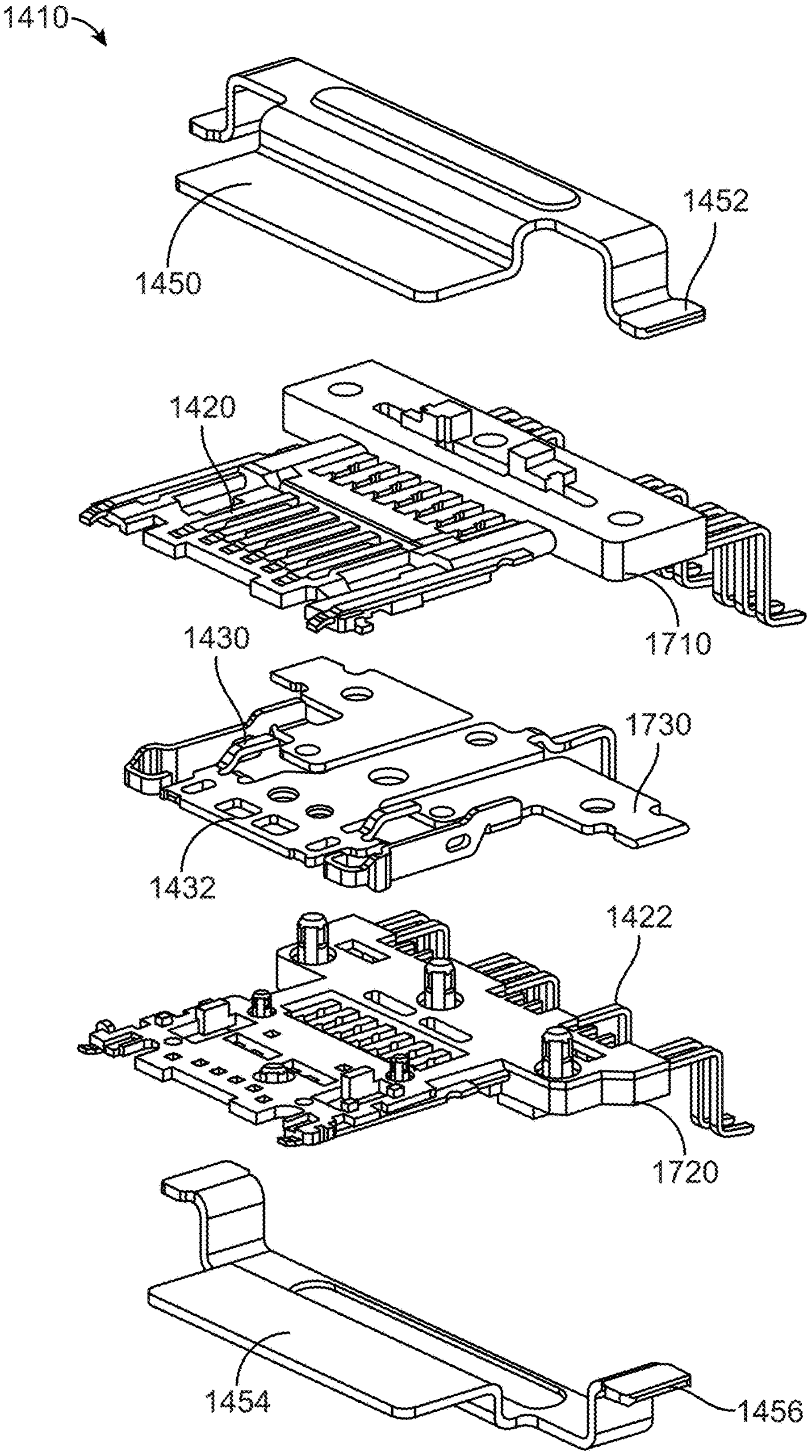
FIG. 17 illustrates an exploded diagram of a tongue for the connector receptacle of FIG. 14.

FIG. 17 illustrates an exploded diagram of a tongue for the connector receptacle of FIG. 14. Tongue 1410 can include top housing 1710 formed around power and data contacts 1420 and bottom housing 1720 formed around power and data contacts 1422. A mid-plate assembly including liquid-detect contact plate 1432 and ground planes 1730 can be positioned between top housing 1710 and bottom housing 1720. EMI or ground pad 1450 can be attached to a top of tongue 1410 and EMI or ground pad 1454 can be attached to a bottom of tongue 1410. Tab 1452 of EMI or ground pad 1450 and tab 1456 or EMI or ground pad 1454 can be attached to ground planes 1730. Liquid-detect contacts 1430 can extend from liquid-detect contact plate 1432.

Figure 18:
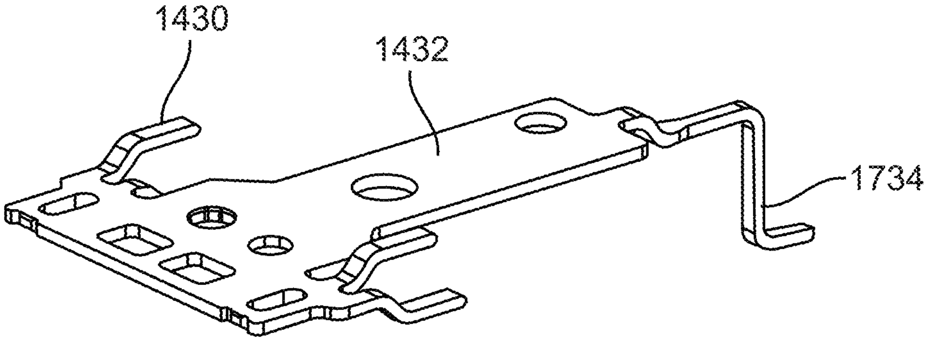
FIG. 18 illustrates liquid-detect contact plate according to an embodiment of the present invention.

FIG. 18 illustrates liquid-detect contact plate according to an embodiment of the present invention. Liquid-detect contact plate 1432 can include liquid-detect contacts 1430. Four liquid-detect contacts 1430 can be located on tongue 1410 (shown in FIG. 17.) Liquid-detect contact plate 1432 can terminate in a single contact 1734. Terminating in a single contact 1734 can simplify connection between tongue 1410 and a board or other substrate (not shown), while providing four liquid-detect contacts 1430 can improve sensitivity to liquid. While four liquid-detect contacts 1430 are shown in this example, other numbers of liquid-detect contacts can be included on connector tongues consistent with an embodiment of the present invention.

In the examples of FIG. 9 and FIG. 12, a signal contact can be routed around a liquid-detect contact while a power contact remains straight and unchanged such that resistance of the power contact is maintained and not increased. In these and other embodiments of the present invention, a signal contact and a power contact can both be routed around a liquid-detect contact. This can allow the liquid-detect contact to have an increased size thereby improving sensitivity. An example is shown in the following figures.

Figure 19:
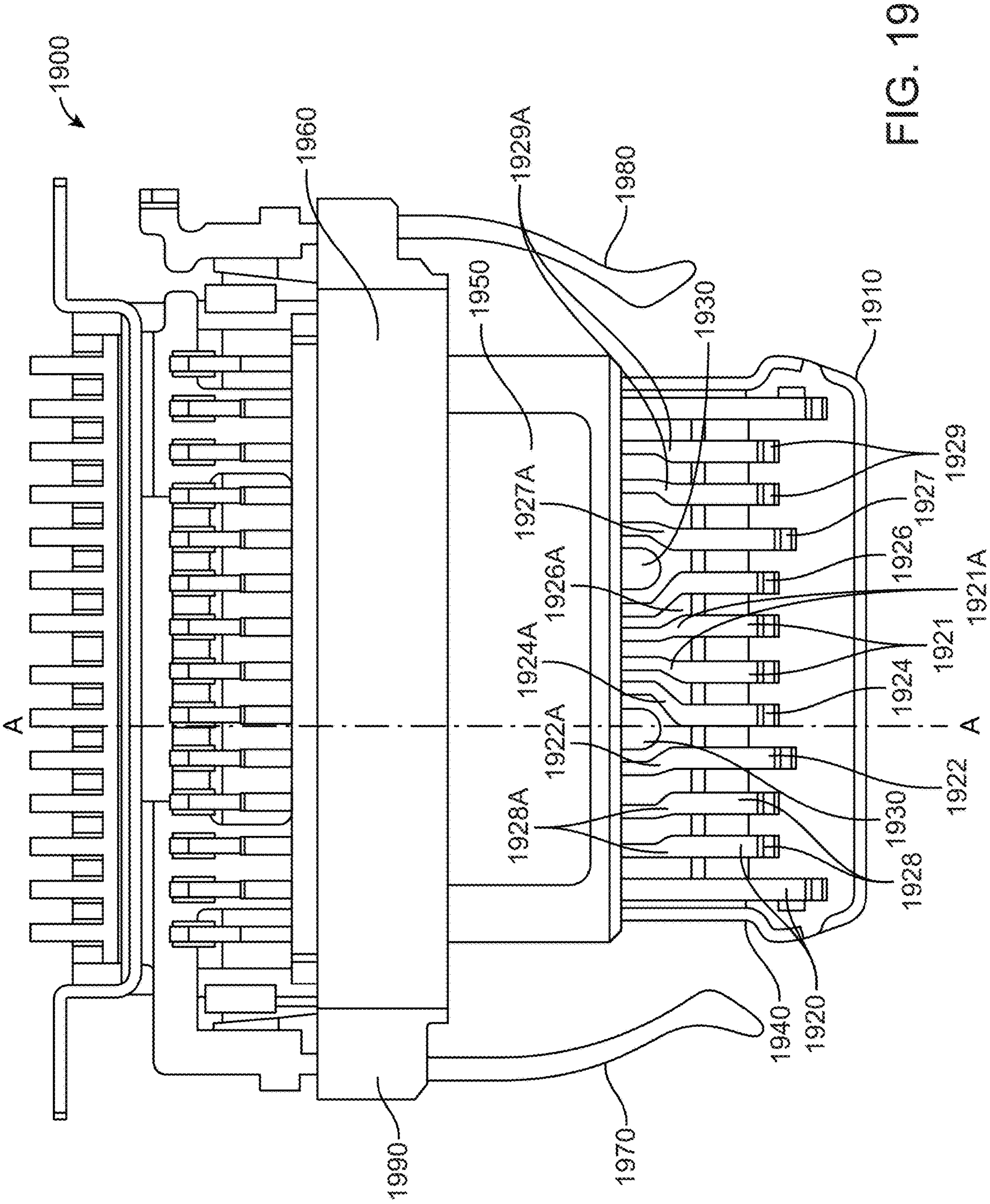
FIG. 19 is a top view of a tongue assembly according to an embodiment of the present invention.

FIG. 19 is a top view of a tongue assembly according to an embodiment of the present invention. Tongue assembly 1900 can be used in connector receptacle 112, connector receptacle 122 (both shown in FIG. 1), or other connector receptacle. Tongue assembly 1900 can include tongue 1910 supporting power and data contacts 1920 and liquid-detect contacts 1930 on a top and bottom side. Tongue 1910 can further support side ground contacts 1940 and EMI or ground pad 1950 on a top and bottom side. Tongue assembly 1900 can further support side ground contact 1970 and connection-detect contact 1980. Bracket 1990 can support shield 1960. Bracket 1990 can secure tongue assembly 1900 to an enclosure of an electronic device, such as handheld computing device 110, portable computing device 120 (both shown in FIG. 1), or other electronic device.

As before, a common corrosion path in a USB Type-C connector can be from VBUS contact 1922 to adjacent CC contact 1924. Accordingly, embodiments of the present invention can include liquid-detect contact 1930 between VBUS contact 1922 and CC contact 1924 on each of the top and bottom sides of tongue 1910. VBUS contact 1922 and CC contact 1924 can be thinned and routed around a liquid-detect contact 1930 to make room for a larger liquid-detect contact 1930. Specifically, VBUS contact 1922 can include angled portion 1922A and CC contact 1924 can include angled portion 1924A. While VBUS contact 722 in FIG. 7 is shown as being straight, VBUS contact 1922 can be routed away from liquid-detect contact 1930 due to the larger size of liquid-detect contact 1930 as compared to liquid-detect contact 730 in FIG. 7. This can cause a minor increase in series impedance of VBUS contact 1922, though the increase can be compensated for by use of lower-impedance materials or plating. Liquid-detect contacts can also be placed between a VBUS contact 1927 and an SBU contact 1926 on a top and bottom of tongue 1910. VBUS contact 1927 and SBU contact 1926 can be angled and treated in the same manner as VBUS contact 1922 and CC contact 1924. Specifically, VBUS contact 1927 can include angled portion 1927A and SBU contact 1926 can include angled portion 1926A. In these and other embodiments of the present invention, transmit signal pair 1928 can be angled at angled portions 1928A away to provide room for angled VBUS contact 1922 and receive signal pair 1929 can be angled at angled portions 1929A away to provide room for angled VBUS contact 1927. To compensate for these angled portions, ends of transmit signal pair 1928 and receive signal pair 1929 can be made narrower near and beneath ground pad 1950 to reduce their capacitive coupling to the ground pad 1950. USB contacts 1921 can also be angled towards each other at angled portions 1921A.

Liquid-detect contacts 1930 can have a decreased spacing to adjacent contacts such as VBUS contact 1922 and CC contact 1924 as compared to the smaller liquid-detect contacts 730 of FIG. 7. This increase in proximity can increase a sensitivity of related liquid-detect circuitry and make the detection of liquid on tongue 1910 more likely. Also, the periphery and area of liquid-detect contacts 1930 can be increased as compared to periphery and area of liquid-detect contacts 730. This, along with the reduced spacing, can increase a capacitance of liquid-detect contacts 1930. This can also act to increase a sensitivity of related liquid-detect circuitry.

Specifically, connector receptacle interface circuitry (not shown) can provide a voltage waveform to liquid-detect contacts 1930 to determine the presence of liquid using Electrochemical-Impedance Spectroscopy (EIS.) The voltage waveform can be a sinewave, square wave, or other voltage waveform. When liquid is present at a liquid-detect contact 1930, a current can result that can indicate a change in capacitance and resistance seen at the liquid-detect contacts 1930, so having a larger capacitance to being with can make detection of changes to the capacitance more readily detectable. That is, connector receptacle interface circuitry can detect the magnitude of this current and any phase shift as compared to the applied voltage, and from that determine a change in capacitance and resistance seen at the liquid-detect contacts 1930. From the changes in capacitance and resistance, the presence of liquid and information regarding the type of liquid that is present can be determined. Further details of this can be found in U.S. Pat. No. 11,658,443, issued May 23, 2023, titled LIQUID DETECTION AND CORROSION MITIGATION, which is incorporated by reference.

Liquid-detect contacts 1930 can be short in length, extending only a short distance beyond ground pads 1950 on a top and bottom of tongue 1910. In this way, liquid-detect contacts 1930 do not connect to any of the contacts (not shown) of a connector insert, such as connector insert 500 (shown in FIG. 5) when connector insert 500 is inserted into a connector receptacle housing tongue assembly 1900.

The placement of liquid-detect contacts 1930 between VBUS contact 1922 and CC contact 1924 can allow liquid to be detected at the most vulnerable positions on tongue 1910. While four liquid-detect contacts 1930 are shown or described in this example, other numbers of liquid-detect contacts 1930 can be included on connector tongues consistent with an embodiment of the present invention, for example more than or fewer than four liquid-detect contacts 1930 can be included. That is, one, two, three, five, or more than five liquid-detect contacts 1930 can be included on tongue 1910 or elsewhere in a connector receptacle housing tongue 1910. Also, liquid-detect contacts 1930, and other liquid-detect contacts (not shown) can be included between other contacts 1920, between contacts 1920 and ground pad 1950, or elsewhere on tongue 1910 or in a connector receptacle supporting tongue 1910.

Figure 20:
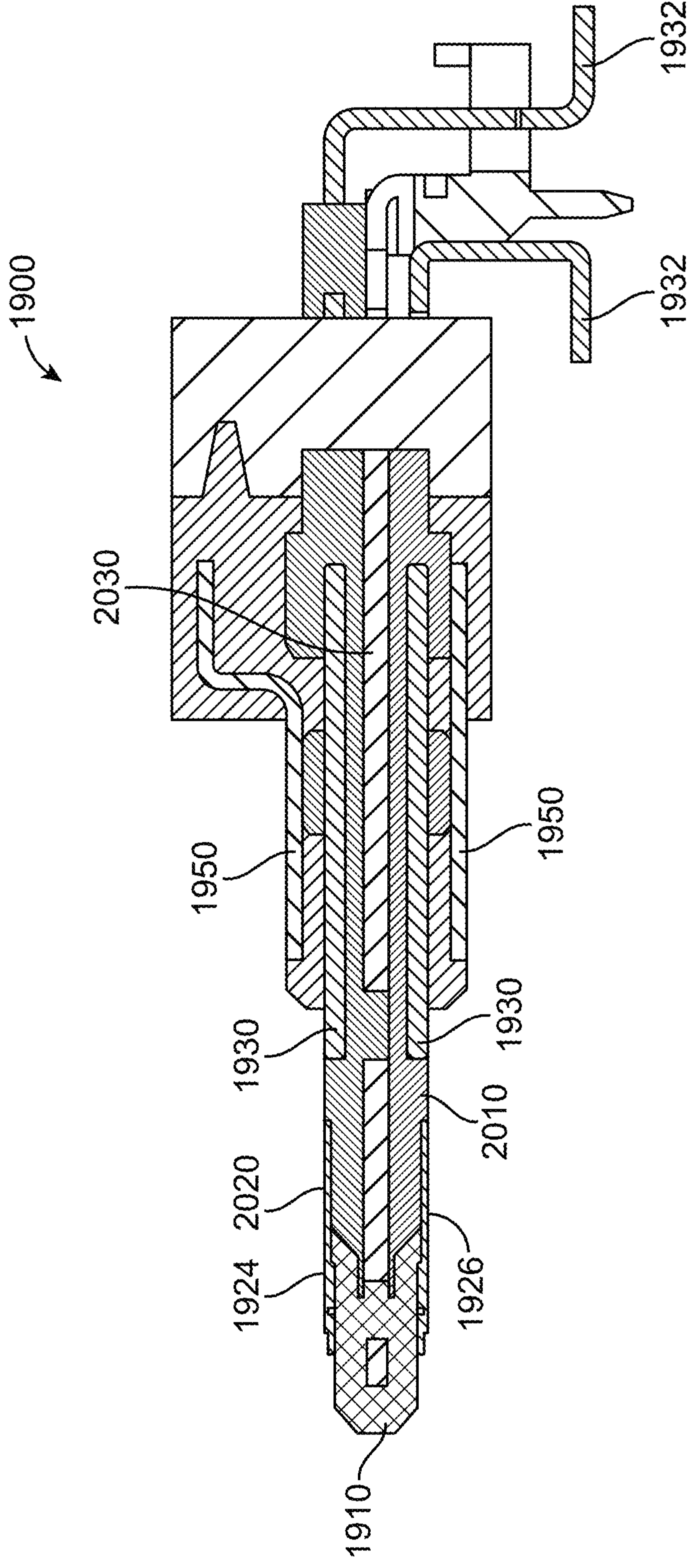
FIG. 20 is a cutaway side view of the tongue shown in FIG. 19.

FIG. 20 is a cutaway side view of the connector receptacle of FIG. 19. This cutaway view of tongue assembly 1900 is taken along line A-A shown in FIG. 19. Liquid-detect contacts 1930 can terminate in surface-mount contacting portions 1932, which can be soldered to pads connected to traces on a printed circuit board (not shown) of an electronic device, such as handheld computing device 110, portable computing device 120 (both shown in FIG. 1), or other electronic device. CC contact 1924 and SBU contact 1926 can be positioned on a top and bottom of tongue 1910, as can ground pads 1950. A central ground plane 2030 can extend through center of tongue 1910.

Liquid-detect contacts 1930, CC contacts 1924, and the other contacts 1920 (shown in FIG. 19) can have a top surface that is at least approximately flush with a top surface of molding 2010 of tongue 1910 near ground pad 1950, for example, behind contacting portions 2020 of contacts 1920. Contacting portions 2020 can be locations where contacts in a corresponding connector insert (not shown) connect with contacts 1920 when the connector insert is mated with a connector receptacle supporting tongue assembly 1900. This planar arrangement can reduce sensitivity since there are no recessed portions or trenches between contacts where liquid can pool and be detected, however this can be compensated for by the large size of liquid-detect contacts 1930. Also, the presence of molding 2010 between contacts 1920 can reduce a capacitance between liquid-detect contacts 1930 and CC contacts 1924, and between liquid-detect contacts 1930 and VBUS contacts 1922. This can make liquid detection more difficult, though again this can be compensated for by the large size of liquid-detect contacts 1930. The presence of molding 2010 between contacts 1920 can help to control the positions of contacts 1920 during manufacturing. Liquid-detect contacts 1930, CC contacts 1924, and the other contacts 1920 can be proud or extend above molding 2010 near a front of tongue 1910 at contacting portions 2020. That is, molding 2010 between contacting portions 2020 of contacts 1920 can be recessed as compared to portions of contacts 1920 between the contacting portions 2020 and ground pad 1950.

Figure 21:
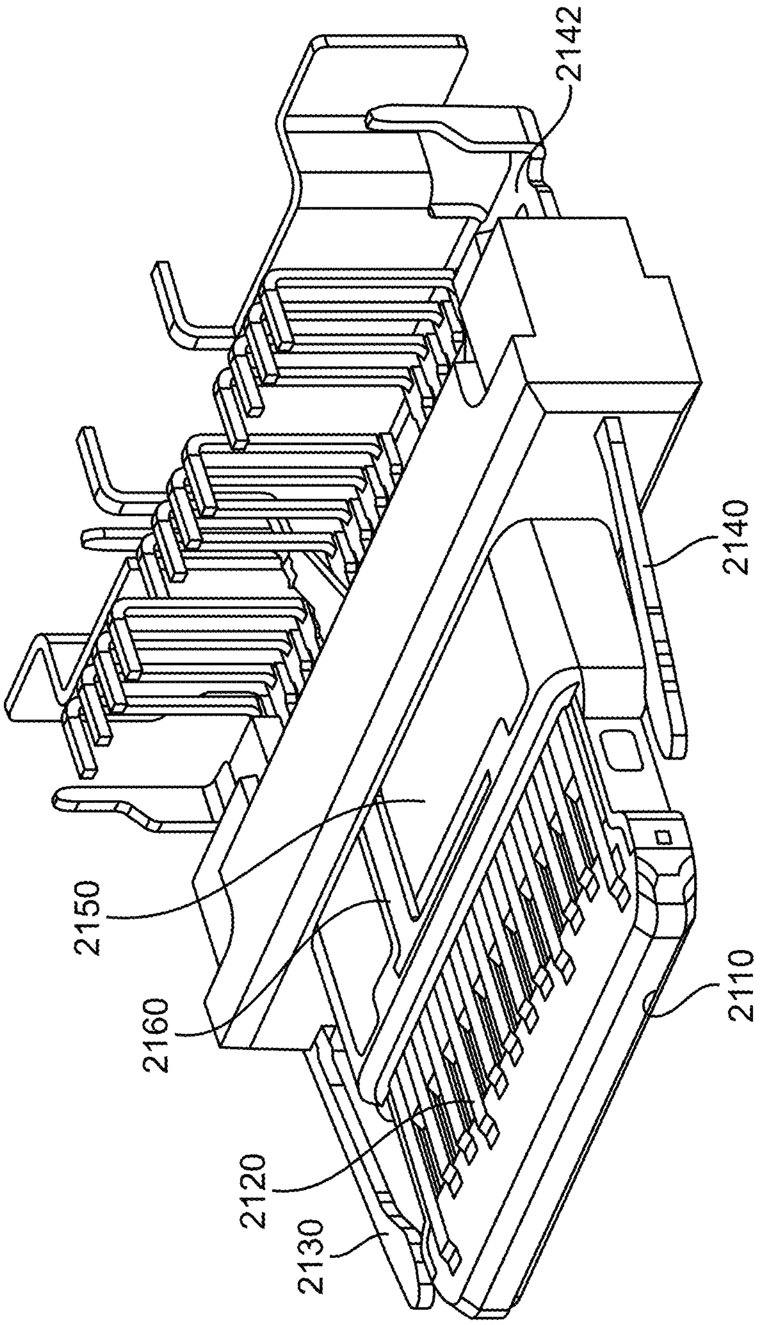
FIG. 21 illustrates a portion of a connector receptacle according to an embodiment of the present invention.

FIG. 21 illustrates a portion of a connector receptacle according to an embodiment of the present invention. Tongue 2110 can be used in connector receptacle 112, connector receptacle 122 (both shown in FIG. 1), or other connector receptacle according to an embodiment of the present invention. Tongue 2110 can support contacts 2120 on a top and bottom side. A portion of EMI or ground pad 2150 can be removed to make room for liquid-detect contact 2160. Liquid-detect contact 2160 can extend along a front edge of EMI or ground pad 2150. Tongue 2110 can further support connection-detect contact 2140, which may be singulated by trimming at or near location 2142. Tongue 2110 can further support side ground contact 2130. Tongue 2110 can support an additional liquid-detect contact 2160 on a bottom side.

These and other embodiments of the present invention can employ various techniques and features to improve the sensitivity of this liquid detection. For example, features to help to guide liquid to one or more liquid-detect contacts can be included on a connector tongue or elsewhere in a connector receptacle or connector insert. Various hydrophobic and hydrophilic coatings can be deposited or placed on the tongue or associated structures to direct liquid to the liquid-detect contacts. Hydrophobic coatings or materials can be used to move liquid on a tongue away from a first location. Hydrophilic coatings or materials can be used to attract liquid to a second location on the tongue. For example, hydrophobic coatings or materials can be used to move liquid away from a front edge of a tongue, and hydrophilic coatings or materials can be used to move liquid towards a liquid-detect contact that is between contacts and near a ground pad, between a number of contacts and the ground pad, or at other locations on the tongue. In these and other examples, trenches, channels, or grooves can be formed in top and bottom sides of the tongue between contacts to direct liquid to the liquid-detect contacts. These trenches, channels, or grooves can provide a capillary effect to move liquid between locations on the tongue. In these and other embodiments of the present invention, liquid can be guided by the coatings, materials, or trenches to one or more liquid-detect contacts on a surface on or near the tongue. An example is shown in the following figure.

Figure 22:
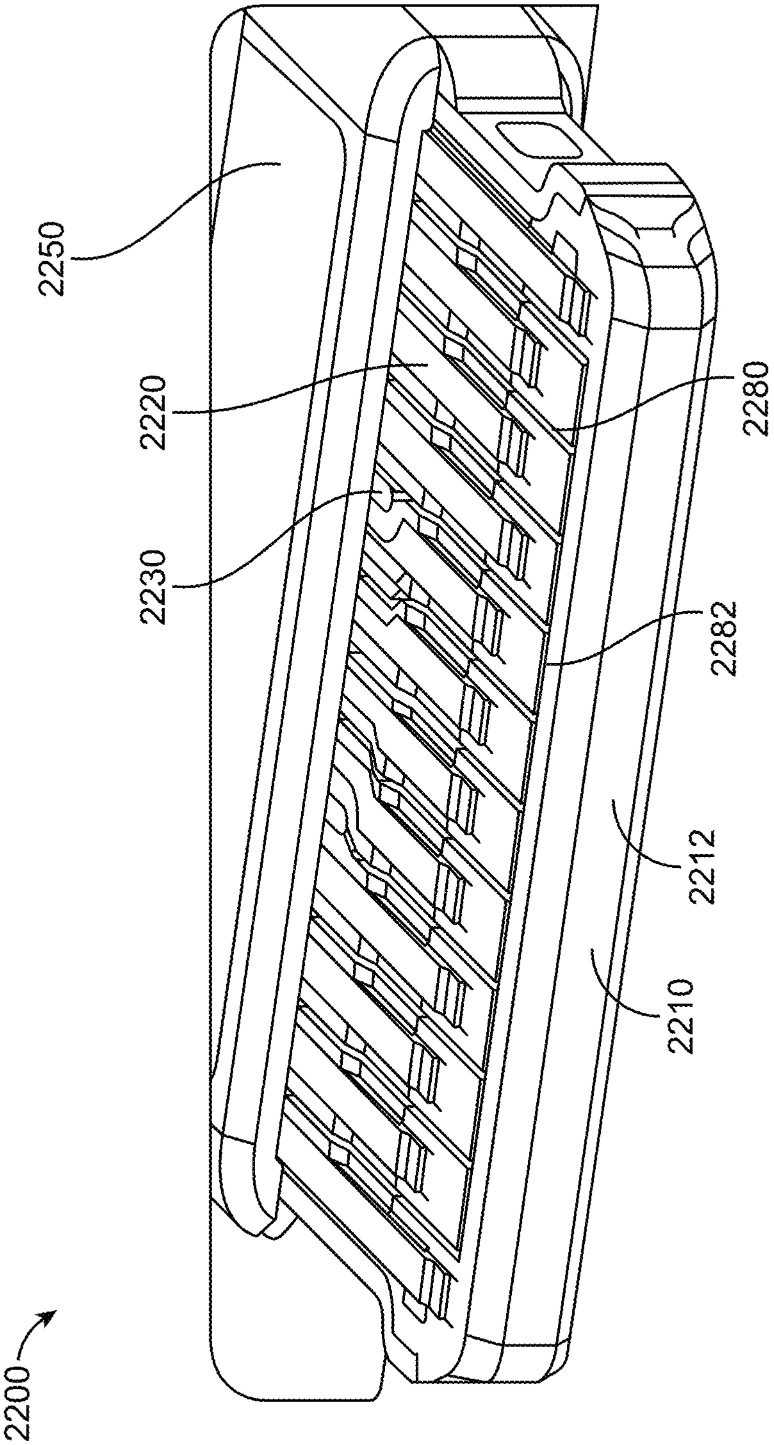
FIG. 22 illustrates a tongue assembly according to an embodiment of the present invention.

FIG. 22 illustrates a tongue assembly according to an embodiment of the present invention. Tongue assembly 2200 can be used in connector receptacle 112, connector receptacle 122 (both shown in FIG. 1), or other connector receptacle. Tongue 2210 can support a number of power and data contacts 2220 and liquid-detect contacts 2230. Trenches, grooves, or channels 2280 can be formed in top and bottom surfaces of tongue 2210 between and among power and data contacts 2220 and liquid-detect contacts 2230, while trench, groove, or channel 2282 (collectively channels 2280) can be formed along front edge 2212 of tongue 2210. Channels 2280 can be arranged to guide liquid on tongue 2210 to one of the liquid-detect contacts 2230. Channels 2280 can be formed by laser etch, chemical etch, molding, or in other ways. Power and data contacts 2220, liquid-detect contacts 2230, channels 2280, and other features can be located on either or both top and bottom surfaces of tongue 2210.

Channels 2280 can have a "V" cross-section, a rectangular cross-section, a "U" cross-section, or other cross-section. The geometry, depth, width, and routing can be varied to improve the capillary flow, the flow volume, and speed. Channels 2280 formed between, among, and along a front edge of tongue 2210, can provide a capillary effect to move liquid between locations on tongue 2210. Channels 2280 can provide a capillary effect to move liquid from a front edge 2212 of tongue 2210 towards one or more liquid-detect contacts 2230. Channels 2280 in the illustrated example can be considered a single channel since they join in a continuous manner. Channels 2280 can be referred to here as separate channels between adjacent contacts 2220 and can optionally include channel 2282 along a front edge 2212 of tongue 2210.

In these and other embodiments of the present invention, liquid can also be guided by hydrophobic and hydrophilic coatings and materials (not shown) to one or more liquid-detect contacts 2230 on a surface on or near tongue 2210. These coatings and materials can be deposited or otherwise placed on tongue 2210, or portions of tongue 2210 can be formed of them. Hydrophobic coatings or materials can be used to move liquid on tongue 2210 away from a first location. Hydrophilic coatings or materials can be used to attract liquid to a second location on tongue 2210. For example, hydrophobic coatings or materials can be used to move liquid away from front edge 2212 of tongue 2210, and hydrophilic coatings or materials can be used to move liquid towards one or more liquid-detect contacts 2230 that are between contacts 2220 and near ground pad 2250, between a number of contacts 2220 and ground pad 2250, or at other locations on tongue 2210.

These and other embodiments of the present invention, such as tongue 710, tongue 1110, tongue 1410, tongue 1910, tongue 2110, and their associated structures can include hydrophobic materials or coatings, hydrophilic materials or coatings, trenches, channels, or grooves that are the same or similar to those shown in FIG. 22.

Figure 23:
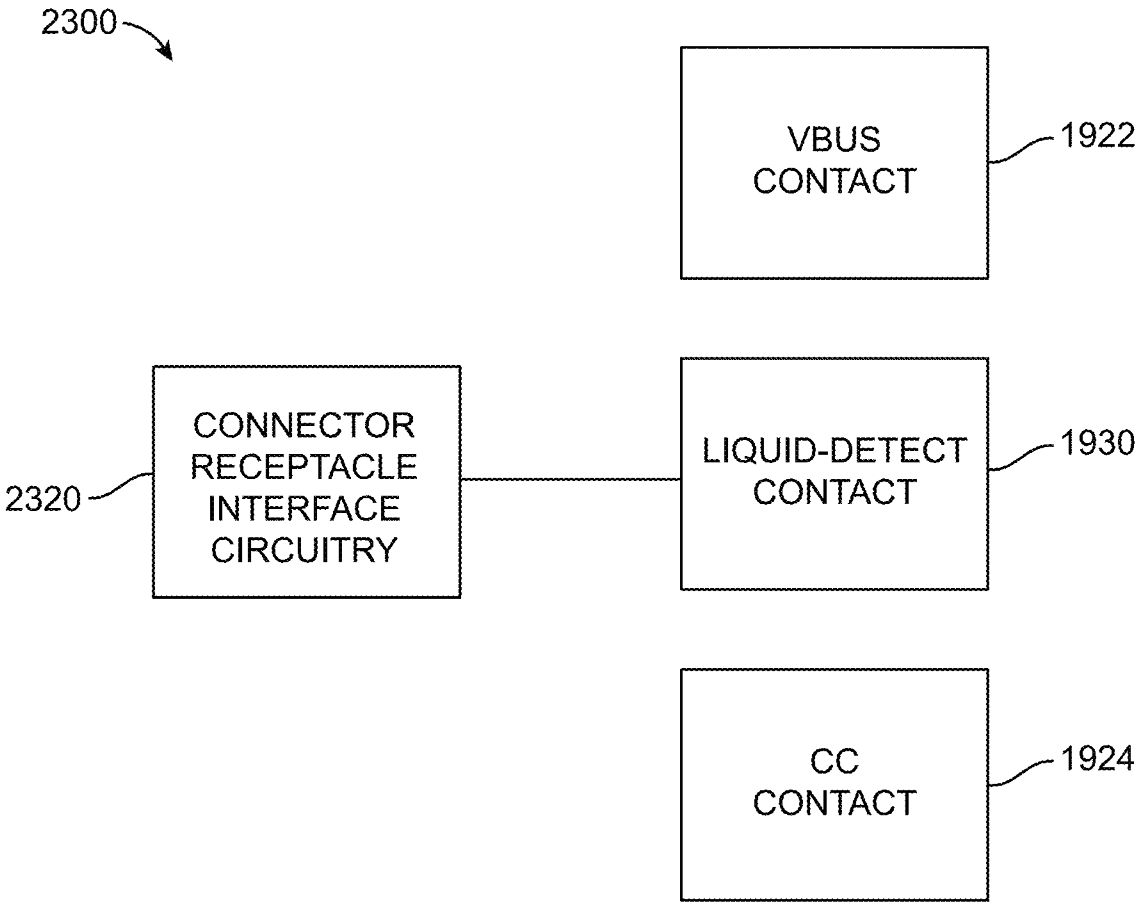
FIG. 23 illustrates connector receptacle interface circuitry according to an embodiment of the present invention.

FIG. 23 illustrates connector receptacle interface circuitry according to an embodiment of the present invention. Connector receptacle interface circuit 2320 can include a sinewave generator, pulse wave generator, transimpedance amplifier, and other circuitry. Connector receptacle interface circuit 2320 can provide a voltage waveform on liquid-detect contact 1930 (or any of the other liquid detect contacts shown here, such as liquid-detect contact 730, 1130, 1430, or other liquid-detect contact provided by embodiments of the present invention.) When liquid is present between liquid-detect contact 1930 and either VBUS contact 1922 or CC contact 1924 (both also shown in FIG. 19), current can flow from liquid-detect contact 1930, through the liquid, to either or both VBUS contact 1922 or CC contact 1924, depending on the location of the liquid. The current flow can appear as a change in capacitance, resistance, or both, as seen from liquid-detect contact 1930. The change in capacitance and resistance can be analyzed and the presence of liquid can be determined. In these and other embodiments of the present invention, a type of liquid can also be determined. Further details of this can be found in U.S. Pat. No. 11,658,443, issued May 23, 2023, titled LIQUID DETECTION AND CORROSION MITIGATION, which is incorporated by reference.

Various mitigating steps can be performed when liquid is detected using connector receptacle interface circuit 2320. These mitigating steps can include acts performed by connector receptacle interface circuit 2320 or other circuit and acts suggested to and performed by a user. These various acts can depend on whether a second electronic device is connected to the liquid detecting connector receptacle. Additional acts can be performed by the second electronic device connected to a liquid detecting connector receptacle.

Connector receptacle interface circuit 2320 or other circuit can perform various acts following a detection of liquid. For example, to prevent corrosion, electric fields between contacts can be reduced. In the embodiment shown in FIG. 19, this can be done by, for one or more contacts 1920, by disconnecting the contact from internal circuitry, by reducing a voltage at the contact, or taking other mitigating step.

In an example, an electric field from VBUS contact 1922 to CC contact 1924 can be reduced. This can be done by reducing a voltage on VBUS contact 1922 by turning off power applied to VBUS contact 1922 (or the other VBUS contacts describer here.) VBUS contact 1922 can further be grounded or connected to ground through a low impedance. CC contact 1924 can be disconnected, grounded, or connected to ground through a low impedance. An example is shown in the following figure.

Figure 24:
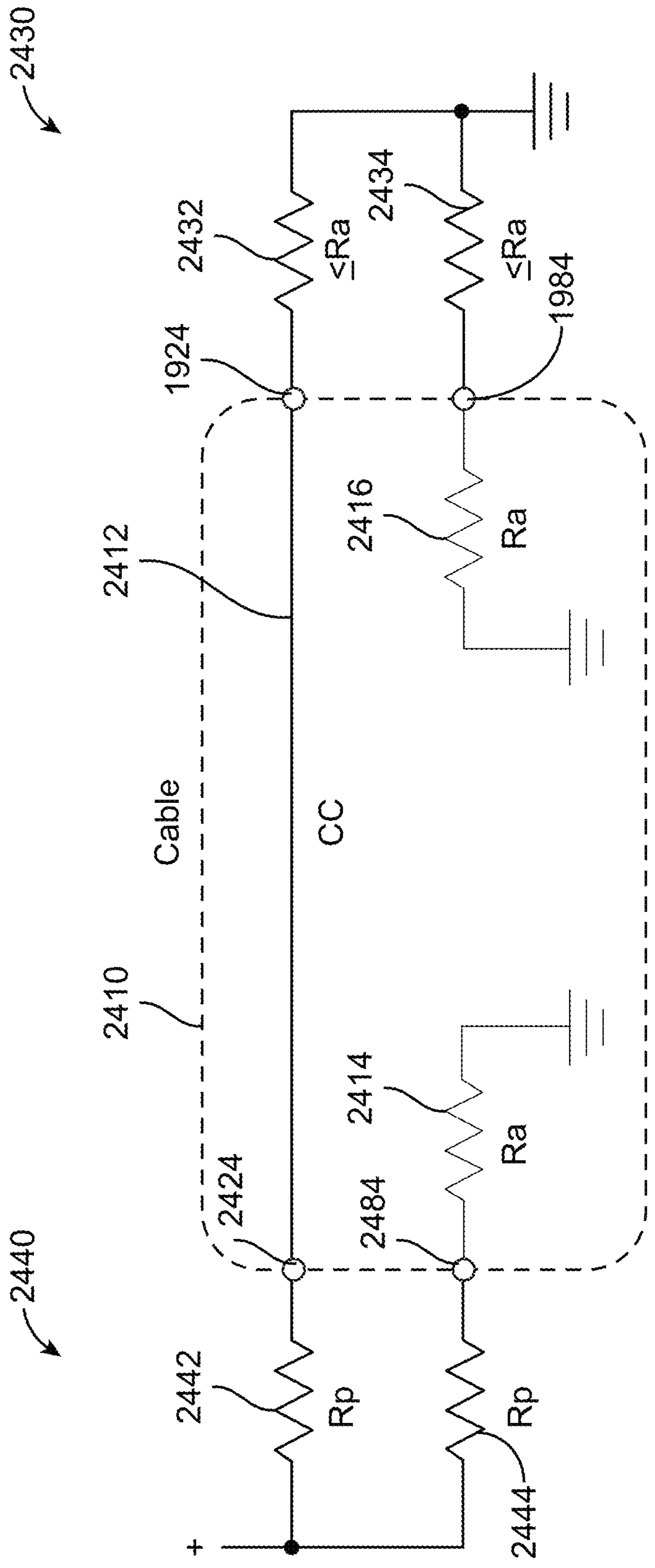
FIG. 24 illustrates circuitry for limiting corrosion on a connector tongue according to an embodiment of the present invention.

FIG. 24 illustrates circuitry for limiting corrosion on a connector tongue according to an embodiment of the present invention. With reference to FIG. 19, a power receiving electronic device 2430 can be connected to a power providing electronic device 2440 through cable 2410. Electronic device 2440 can provide pull-up 2442 through CC contact 2424 and pull-up 2444 through CC contact 2484 at a USB Type C connector receptacle, where CC contact 2424 and CC contact 2484 are on opposite sides of a tongue. CC contact 2424 can connected through conductor 2412 to CC contact 1924 of tongue assembly 1900 in power receiving electronic device 2430. Cable 2410 can optionally provide resistor 2414 that can be connected to CC contact 2484 and resistor 2416 that can be connected to CC contact 1984. CC contact 1924 and CC contact 1984 can be located on opposite sides of tongue 1910 in tongue assembly 1900.

During a connection, pull-up 2442 can pull up on CC contact 1924, which can increase the voltage on CC contact 1924. This increase in voltage can be detected by electronic device 2430 and charging negotiations with electronic device 2440 can begin. The USB Type-C receptacle for electronic device 2430 can be connector receptacle 112, connector receptacle 122 (both shown in FIG. 1), or other connector receptacle.

When liquid is detected on tongue 1910, CC contact 1924 can be grounded or connected to ground through a low impedance of resistor 2432. In this example, CC contact 1924 can be connected to ground through resistor 2432, which has a resistance that is less than a value Ra, where Ra is a permitted range of resistance for CC contact 1924 to have during a connection detection of a USB Type C compliant source. This resistance can reduce a voltage on CC contact 1924, which can reduce a rate of corrosion on CC contact 1924. In these and other embodiments of the present invention, CC contact 1924 can be disconnected from resistor 2432. An example is shown in U.S. Pat. No. 11,658,443, issued May 23, 2023, titled LIQUID DETECTION AND CORROSION MITIGATION, which is incorporated by reference. In these and other embodiments of the present invention, CC contact 1924 can be connected to ground, for example through a transistor (not shown) having a gate controlled by connector receptacle interface circuit 2320 (shown in FIG. 23), a drain connected to CC contact 1924, and a source connected to ground. VBUS contact 1922 (and the other VBUS contacts) can be disconnected from internal power supply circuitry, the internal power supply circuitry can be at least partially powered down, VBUS contact 1922 can be grounded or connected to ground through a low impedance, or other steps can be taken to reduce the electric fields from the VBUS contacts and to reduce any dendrite growth between the VBUS contacts and adjoining or nearby contacts. Similarly, CC contact 1984 can be pulled to ground through a low impedance 2434. CC contact 1984 can be disconnected in these and other embodiments of the present invention following a detection of liquid.

In these and other embodiments of the present invention, electronic device 2430 can react in the same or a similar manner whether CC contact 1924 or CC contact 1984 is connected to CC contact 2424 through conductor 2412 in cable 2410. That is, electronic device 2430 can operate the same following a detection of liquid independently of a rotation of a connector insert. In these and other embodiments of the present invention, only one circuit to ground or provide a low impedance to a CC contact might be available. In such an embodiment, once liquid is detected, CC contact 1924 can be grounded or connected to ground through a low impedance. CC contact 1984 can be left unchanged and monitored for a connection to either pull-up 2442 or pull-up 2444. When such a pull-up is detected, the circuitry for grounding or connecting to ground through a low impedance can be disconnected from CC contact 1924 and connected to CC contact 1984. CC contact 1984 can then be grounded or connected to ground through a low impedance and CC contact 1924 can optionally monitor for a pull-up connection.

Other actions can be taken once liquid is detected in a connector receptacle. Notifications can be provided to a user that power is being reduced or removed from the VBUS contacts. A suggestion to a user to disconnect a connector insert, such as connector insert 132 or connector insert 134 that is inserted into the connector receptacle, such as connector receptacle 112 or connector receptacle 122 (all shown in FIG. 1) can be made. A suggestion to turn off the electronic device can be made. In these and other embodiments of the present invention, a determination of which of several liquid-detect contacts is exposed to liquid can be made and a corresponding VBUS contact can be powered down or converted to a high-impedance while the other VBUS contacts can remain powered. One or more other contacts, such as CC contact 1924 or SBU contact 1926 can be disconnected or converted to a high-impedance until the liquid is removed. In these and other embodiments of the present invention, these and other actions can be performed in various combinations.

Embodiments of the present invention can provide connector receptacles that can accept connector inserts that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Embodiments of the present invention are shown below as being embodied in or circuits associated with USB Type-C receptacles. These and other embodiments of the present invention can be incorporated in other types of connectors and associated circuits as well. Also, while embodiments of the present invention are well-suited to use in connector receptacles, these and other embodiments of the present invention can be utilized in connector inserts and other types of connectors as well. Also, while four liquid-detect contacts are shown in the examples above, other numbers of liquid-detect contacts, such as one, two, three, four, or more than four liquid-detect contacts can be included on a tongue or elsewhere in a connector receptacle, connector insert, or other connector in these and other embodiments of the present invention.

In these and other embodiments of the present invention, contacts, shields, reinforcement frames, and other conductive portions of a connector receptacle can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with nickel, gold, or other material.

The nonconductive portions, such as housings, moldings tongues, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide connector receptacles that can be located in various types of devices, such as tablet computers, laptop computers, desktop computers, all-in-one computers, cell phones, storage devices, wearable-computing devices, portable computing devices, portable media players, navigation systems, monitors, remotes, adapters, and other devices.

While embodiments of the present invention are well-suited to use in connector receptacles, these and other embodiments of the present invention can be utilized in connector inserts and other types of connectors as well.

Various examples are described above using specific contacts, such as liquid-detect contacts 1930, and various tongues or tongue assemblies, such as tongue 1910 and tongue assembly 1900. These examples also apply to the other tongues and tongue assemblies, such as tongue 710 and tongue assembly 700, tongue 1110 and the tongue assembly of connector receptacle 1100, tongue 1410, and the tongue assembly of connector receptacle 1400, and other tongues or tongue assemblies provided for by embodiments of the present invention. Reference numbers are used consistently throughout the figures and their descriptions. While features are shown on one side of a tongue in the above examples, the same or similar features can be repeated on an opposite side of the tongue.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:
- a housing having a passage;
- a tongue located in the passage;
- a first plurality of contacts on a top side of the tongue;
- a second plurality of contacts on a bottom side of the tongue;
- a first opening in a first side of the passage;
- a first side ground contact positioned in the first opening in the passage, the first side ground contact having a contacting portion;
- a second opening in the passage; and
- a first connection-detect contact positioned in the second opening in the passage, the first connection-detect contact having a contacting portion positioned further from a front of the connector receptacle than the contacting portion of the first side ground contact.

2. The connector receptacle of claim 1 wherein the second opening is in a second side of the passage, the second side opposite the first side.

3. The connector receptacle of claim 1 wherein the first connection-detect contact comprises a bend to increase a beam length of the first connection-detect contact.

4. The connector receptacle of claim 1 wherein the second opening is in a bottom of the passage, the bottom of the passage below the tongue.

5. The connector receptacle of claim 4 further comprising a second side ground contact in a third opening and a second connection-detect contact in a fourth opening.

6. The connector receptacle of claim 1 further comprising a first tab along a portion of an outside edge of the first side ground contact and a second tab along a portion of an outside edge of the first connection-detect contact.

7. The connector receptacle of claim 6 wherein the first tab and the second tab are formed of plastic.

8. A connector receptacle comprising:
- a housing having a passage;
- a tongue located in the passage;
- a first plurality of power and data contacts on a top side of the tongue;
- a second plurality of power and data contacts on a bottom side of the tongue;
- a first liquid-detect contact on the top side of the tongue; and
- a second liquid-detect contact on the bottom side of the tongue.

9. The connector receptacle of claim 8 further comprising a first plurality of trenches, each between adjacent power and data contacts on the top side of the tongue and a second plurality of trenches, each between adjacent power and data contacts on the bottom side of the tongue.

10. The connector receptacle of claim 8 further comprising:

a hydrophobic coating on the top side of the tongue near a front edge of the tongue and a hydrophilic coating on the top side of the tongue near the first liquid-detect contact.

11. The connector receptacle of claim 8 wherein at least one of the first plurality of power and data contacts is routed around the first liquid-detect contact.

12. The connector receptacle of claim 11 wherein the first liquid-detect contact and the second liquid-detect contact are coupled to an Electrochemical-Impedance Spectroscopy circuit.

13. The connector receptacle of claim 11 further comprising a connection-detect contact.

14. The connector receptacle of claim 13 wherein the connection-detect contact is positioned in a side opening in the passage.

15. The connector receptacle of claim 14 further comprising a third liquid-detect contact on the top side of the tongue and a fourth liquid-detect contact on the bottom side of the tongue, wherein the first liquid-detect contact, the second liquid-detect contact, the third liquid-detect contact, and the fourth liquid-detect contact are connected to a liquid-detect contact plate, wherein the liquid-detect contact plate terminates in a single contact.

16. A connector receptacle comprising:

a tongue;

a ground pad on a top side of the tongue;

a first plurality of contacts on the top side of the tongue, the first plurality of contacts including a first contact extending a first length from the ground pad to a front edge of the tongue and a second contact extending a second length from the ground pad to the front edge of the tongue; and a liquid-detect contact between the first contact and the second contact and extending a third length from the ground pad to the front edge of the tongue, where the first length and the second length are longer than the third length.

17. The connector receptacle of claim 16 wherein the first contact includes a first angled portion such that the first contact angles around the liquid-detect contact.

18. The connector receptacle of claim 17 wherein the second contact includes a second angled portion such that the second contact angles around the liquid-detect contact.

19. The connector receptacle of claim 18 wherein the first contact comprises a VBUS contact and the second contact comprises a CC contact for a Universal Serial Bus Type-C connector receptacle.

* * * * *